United States Patent
Haghpassand

(10) Patent No.: US 9,037,738 B2
(45) Date of Patent: May 19, 2015

(54) WEB-BASED SECURITY AND FILTERING SYSTEM FOR INBOUND/OUTBOUND COMMUNICATIONS WITH PROXY CHAINING

(75) Inventor: Joshua Haghpassand, Bayside, NY (US)

(73) Assignee: Joshua Haghpassand, Bayside, NY (US)

( * ) Notice: Subject to any disclaimer, the term of this patent is extended or adjusted under 35 U.S.C. 154(b) by 164 days.

(21) Appl. No.: 12/462,122

(22) Filed: Jul. 29, 2009

(65) Prior Publication Data

US 2009/0300196 A1  Dec. 3, 2009

Related U.S. Application Data

(62) Division of application No. 09/661,876, filed on Sep. 14, 2000, now Pat. No. 7,587,499.

(51) Int. Cl.

| | |
|---|---|
| G06F 15/16 | (2006.01) |
| H04L 12/58 | (2006.01) |
| G06F 21/50 | (2013.01) |
| H04L 29/06 | (2006.01) |
| H04L 29/08 | (2006.01) |

(52) U.S. Cl.
CPC .............. *H04L 12/585* (2013.01); *G06F 21/50* (2013.01); *H04L 29/06* (2013.01); *H04L 51/12* (2013.01); *H04L 63/0428* (2013.01); *H04L 63/14* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 5,678,041 A | 10/1997 | Baker | |
| 5,696,898 A | 12/1997 | Baker | |
| 5,734,831 A * | 3/1998 | Sanders | ........................ 709/223 |
| 5,748,882 A | 5/1998 | Huang | |
| 5,748,897 A | 5/1998 | Katiyar | |
| 5,765,153 A | 6/1998 | Benantar | |
| 5,781,550 A | 7/1998 | Templin | |
| 5,805,803 A | 9/1998 | Birrell | |
| 5,805,820 A | 9/1998 | Bellovin | |
| 5,826,014 A * | 10/1998 | Coley et al. | ..................... 726/12 |
| 5,835,722 A | 11/1998 | Bradshaw | |

(Continued)

OTHER PUBLICATIONS

Zenel, Bruce. "A general purpose proxy filtering mechanism applied to the mobile environment." Wireless Networks. vol. 5, Issue 5, Oct. 1999. 391-409. Kluwer Academic Publishers.*

(Continued)

*Primary Examiner* — Jeffrey R Swearingen
(74) *Attorney, Agent, or Firm* — Mark M. Friedman

(57) ABSTRACT

A customizable system for filtering web-based HTTP requests for outbound and inbound access to web sites. An administrative module in a user computer configures a range of access levels for inbound and outbound communications and has list maintenance functions. Users attempting to access an unfriendly site are anonymously forwarded to a friendly site or the request is terminated. A first proxy server in each user computer of a LAN has access to the WWW, has a customizable friendly and unfriendly outbound list, one of which is active and a customizable friendly and unfriendly inbound list, one of which is active. A second HTTP proxy server without an administrative module or friendly or unfriendly lists is between the first proxy server and the Internet as a LAN gateway or at an ISP domain, the second proxy being capable of communicating to a proxy of a destination or directly to a destination.

99 Claims, 11 Drawing Sheets

(56) References Cited

U.S. PATENT DOCUMENTS

| | | | |
|---|---|---|---|
| 5,864,871 A | 1/1999 | Kitain | |
| 5,867,665 A | 2/1999 | Butman | |
| 5,898,830 A | 4/1999 | Wesinger | |
| 5,903,732 A | 5/1999 | Reed | |
| 5,915,087 A | 6/1999 | Hammond | |
| 5,918,013 A | 6/1999 | Mighdoll | |
| 5,923,756 A | 7/1999 | Shambroom | |
| 5,941,947 A | 8/1999 | Brown | |
| 5,950,195 A | 9/1999 | Stockwell | |
| 5,991,810 A | 11/1999 | Shapiro | |
| 5,996,011 A | 11/1999 | Humes | |
| 6,003,077 A | 12/1999 | Bawden | |
| 6,003,084 A | 12/1999 | Green | |
| 6,018,619 A | 1/2000 | Allard | |
| 6,049,821 A | 4/2000 | Theriault | |
| 6,052,788 A | 4/2000 | Wesinger | |
| 6,112,228 A * | 8/2000 | Earl et al. | 709/229 |
| 6,144,959 A * | 11/2000 | Anderson et al. | 709/224 |
| 6,158,008 A | 12/2000 | Maria | |
| 6,161,139 A | 12/2000 | Win | |
| 6,212,560 B1 * | 4/2001 | Fairchild | 709/223 |
| 6,260,061 B1 * | 7/2001 | Krishnan et al. | 709/218 |
| 6,345,303 B1 | 2/2002 | Knauerhase | |
| 6,397,259 B1 | 5/2002 | Lincke | |
| 6,453,353 B1 | 9/2002 | Win | |
| 6,463,474 B1 | 10/2002 | Fuh | |
| 6,484,261 B1 | 11/2002 | Wiegel | |
| 6,493,717 B1 * | 12/2002 | Junkin | 707/754 |
| 6,539,430 B1 | 3/2003 | Humes | |
| 6,584,508 B1 | 6/2003 | Epstein | |
| 6,604,143 B1 | 8/2003 | Nagar | |
| 6,611,863 B1 | 8/2003 | Banginwar | |
| 6,785,705 B1 | 8/2004 | Kocherlakota | |
| 6,826,626 B1 | 11/2004 | McManus | |
| 7,249,175 B1 | 7/2007 | Donaldson | |

OTHER PUBLICATIONS

Oppliger, Rolf. "Internet security: firewalls and beyond." Communications of the ACM. May 1997. ACM Press. vol. 40, Issue 5, 92-102.*

Held, Gilbert: "Working with Cisco Access Lists", International Journal of Network Management, vol. 9, issue 3, 151-154, May 1999 John Wiley & SOns, Inc.

Bolding, Darren. "Network Security, Filters and Firewalls" Crossroads, vol. 2, Issue 1, Sep. 1995, ACM Press.

Gupta, Vipul et al. "Secure and Mobile networking." Mobile Networks and Applications. vol. 3, Issue 4, 381-390, Kluwer Academic Publishers. Dec. 1998.

Adoba et al. RFC 2607: Proxy Chaining and Policy Implementation in Roaming. www.rfceditor.org. The Internet Society. Jun. 1999.

Posey, Brien M. "Creating a Proxy Server Chain" www.techrepublic.com. Dec. 1, 1999.

* cited by examiner

WEB-BASED SECURITY AND FILTERING SYSTEM FOR INBOUND/OUTBOUND COMMUNICATIONS WITH PROXY CHAINING

PRIORITY INFORMATION

This patent application claims priority from and is a divisional patent application of U.S. patent application Ser. No. 09/661,876 previously filed by Applicant and Inventor Joshua Haghpassand on Sep. 14, 2000, now U.S. Pat. No. 7,587,499 which is incorporated herein by reference in its entirety.

BACKGROUND OF THE INVENTION

This invention relates to controlling web-based network communications on the Internet and more particularly it relates to a customizable system for both filtering web-based Internet requests for outbound access to web sites and for controlling web-based Internet requests for inbound access by others of a web site of the system.

The World Wide Web provides minimal security protection for its users and service providers. Major service providers create expensive and complex security zones to control the inbound user access. The cost prohibitive and complex nature of this solution is not suitable for a growing number of small business with simple computer systems.

Different security threats exist for Internet users where WWW browsers can provide unlimited access to many unsuitable resources, unsuitable for users within a certain age and preference. Occasionally, the highjacking of the user browser's control poses annoying problems. Parents having Internet enabled computers at home feel helpless and concerned about the future of their children who may access inappropriate adult Internet content in their absence.

The present invention addresses these concerns and more and it may provide, in summary a combination customizable system for filtering web-based requests for outbound access to web sites and for controlling web-based requests for inbound access by others of a web site of the system. It includes an administrative module that may include configuration settings for inbound and outbound communications, list maintenance functions and that may be located in a user computer for configuring a range of access levels from maximum access to full suspension and may have administrator account, regular accounts and one anonymous guest account to be used by general users with no system-based account. If a user attempts to access an unfriendly site the user may be anonymously forwarded to a friendly site. A first proxy server which is a firewall system in each user computer of a local area network may have access to the world wide web, may have a customizable friendly and unfriendly outbound list, one of which may be active and a customizable friendly and unfriendly inbound list, one of which may be active. A second HTTP proxy server may exist between the first proxy and the Internet and may be located as a gateway of a Local Area Network system or at an Internet Service Provider. The second proxy server may be capable of communicating to a HTTP proxy server of a destination or directly to a destination and may have an Internet Protocol address known only to the system's first proxy server administrator. The system may automatically generate a logfile of all web sites visited by each user. For single users in a home or office the second proxy may be provided through the Internet Server Provider.

OBJECTS AND ADVANTAGES

The following objects and advantages may be present in certain embodiments of the present invention:

(1) to provide a filtering and monitoring system for HTTP network communications, (2) to provide such a system that is for both outbound and inbound HTTP communications, (3) to provide such a system that is tamper-proof, (4) to provide such a system that uses an administrative module that has unfriendly and friendly lists for both inbound and outbound communications, (5) to provide such a system wherein the administrative module is an interface located in a user computer for configuring a range of access levels applicable to the user and wherein the range of access levels ranges from maximum unlimited access to full suspension and the administrative module is capable of creating three types of user accounts that have unique user names and passwords for each account including (a) an administrator account that is self-configuring, meaning having the full power to do the configuring (b) regular accounts with administrative privileges other than the privilege or power to create additional accounts or view information on any other accounts and (c) regular accounts without administrative privileges and in addition a fourth type of user account namely one anonymous guest user account to be used by all general users having no system-based user name or password (the word "system" meaning the system of the present invention), (6) to provide such a system wherein the administrative module includes configuration settings for inbound communications and for outbound communications and has list maintenance functions that including list editing, list deleting, searching of lists, saving of lists, proxy chaining routing, adding and deleting users, interchanging lists and importing and exporting lists, (7) to provide such a system that is suitable for persons of all ages, (8) to provide a system of filtering and monitoring both inbound and outbound web-based Internet communications that employs proxy chaining, (9) to provide such a system wherein the inbound communications is set up so that the actual location of the highly sensitive resources are located in an unpublished location that is the replacement location to which are rerouted requests rejected by the system's first proxy server and wherein approved users' hosts are listed in the first proxy server in the unfriendly inbound list are bounced by the first proxy server to the alternative location at the unpublished address having the resources and users' hosts who need to be rejected for access are assumed by the proxy server to be friendly and have their request sent to a published address that contains harmless information,

(10) to provide a system of filtering and monitoring that is suitable for a single user or for groups of users and that is suitable for HTTP over TCP/IP communications protocols and

(11) to provide such a system suitable for users having a dialup modem connection to the Internet and users having Internet access through network lines (direct Internet access).

DETAILED DESCRIPTION OF THE DRAWINGS

Figure 1A:
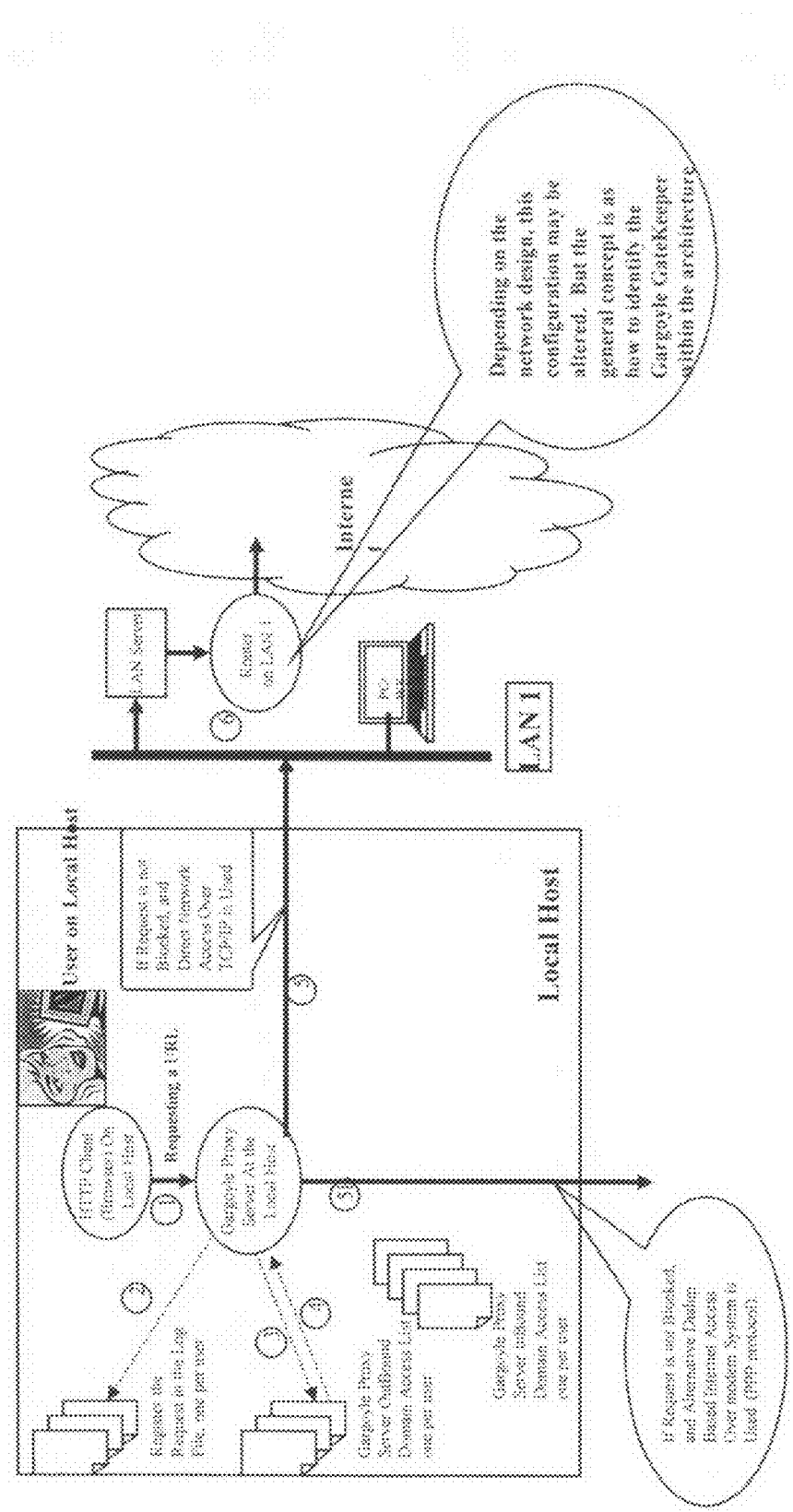
FIG. 1A shows the Outbound client's HTTP requests and system of the present invention.

The system of the present invention addresses both inbound and outbound web-based communication requests. Before describing the Figures herein, the following terms are clarified. HTTP means Hypertext Transfer Protocol which is the protocol used for web-based interprocess network communication.

All the HTTP applications are software processes that are HTTP "protocol" for interprocess network communications. HTTP clients are HTTP applications that can receive user or process generated inputs and generate outputs and may provoke actions or events on other software applications such as web servers. The inputs are either generated through use of Graphical User Interface (GUI) tools or via other software processes, or are self-generated by the client application. Actions are mostly in response to client requests for statically or dynamically created formatted files.

The term "HTTP Browser" as used in this application refers to commercially available software applications of a user that handles the user's requests to go onto the Internet. Examples of HTTP Browser software include those sold under the name Netscape Navigator and Microsoft Explorer. HTTP Browsers are located in and may be launched from the user's computer after being installed there. In the description of the system of the present invention, we sometimes call the HTTP browser the "HTTP Client" because it is the browser, not the user, that deals with the web server and there are many browser's making requests to a particular web server. It is important to note, however, that the browser applications are only one type of HTTP client. The system of the present invention is suitable for all types of HTTP clients and is not limited to browser-based deployment.

A "web server" is the software application that manages someone's web site. The web server serve many "clients" by responding to requests from the "clients" for resources (the web site) and forwards the resources to the clients or refers the request to another web server.

The term "router" means the connectors that are used to link different networks together. Routers can direct or route information to the correct destination in cyberspace.

The term "gateway" is often used to link two different networks types together, for example the transfer of information between a Macintosh network and a PC network. A gateway is usually a computer that acts as a connection between a private internal network another network such as the Internet. Gateways may be used as firewalls. When gateways are used as firewalls they can transmit information from an internal network to the Internet. Gateways can also examine incoming information to determine if the information should be allowed entry to the network.

The term "proxy server" represents a destination to the client and it is a piece of software application. All proxy server's referred to in this patent application are HTTP-based proxy servers which use HTTP protocol for interprocess network communication.

The first proxy server of the system of the present invention is sometimes called by its trade name "Gargoyle". A user would configure his or her browser to use our system's first proxy server (Gargoyle) and place it intermediate between the user's browser and the network (the Internet). This is done by inserting the correct settings in the browser settings window such as the host's IP address and port number that the proxy server is accepting client requests from (running on). The host can be although it does not necessarily have to be the local host, i.e. the same computer that the browser is deployed on.

In computer science terms, the Gargoyle dispatcher or scheduler runs with the "main process thread". The dispatcher starts a server socket and waits for client socket connection requests. Upon receiving such requests, the server socket opens a client socket for that particular connection and spawns a worker thread and passes that socket handler to that worker thread. After the HTTP client (browser) receives the requested resources, the dispatcher terminates the working thread. Accordingly, only the main thread continues running indefinitely until the user terminates the application process and closes out of Gargoyle (the first proxy server).

In the Figures of the present invention "WS" refers to a work station; "PC" refers to a personal computer, "LAN" refers to a local area network, "PPP" is defined as point to point protocol which is the kind of protocol used for modem-based communication; and "TCP" means transmission control protocol.

A friendly list means a list of preferred names of entities such as URLs or subsets of URLs. A match with a friendly list results in the requested URL being forwarded. Accordingly, a friendly list is a list of resources and/or client IP addresses approved for access. An unfriendly list is a list of non-preferred names of entities such as URLs or subsets of URLs. A match with an unfriendly list results in the request not being forwarded to the destination—instead being terminated or forwarded elsewhere. Accordingly, an unfriendly list is a list of resources and/or client IP addresses disapproved for access.

FIG. 1A shows the Outbound client's HTTP requests in the system of the present invention. The large box on the left of FIG. 1A is represented in subsequent Figures as a picture of a work station or computer. As seen from FIG. 1A, the following steps occur when the local user wishes to visit a web site on the World Wide Web. First, the HTTP browser/client forwards the request for a URL, which is called herein an "outbound communication" to the system's first proxy server (Gargoyle). Second, Gargoyle is programmed to automatically register the request in a logfile of all web sites requested by that user account.

Third, Gargoyle checks the identity of the requesting client for approval. If it is an internal client then the outbound list is used as a reference point and if the client is an external client then the inbound list is used as a reference point. Gargoyle then checks the identity of the requested URL against the friendly or unfriendly list as the reference point and which is being maintained by Gargoyle for that particular user account based on the configured access rules. The list used as a reference point is outbound if the request is an outbound request and the client is internal and the list used as a reference point is inbound if the request is inbound and the client is external.

The fourth step is to process the domain authentication based on the configured access security rules. For example, if there is found a partially or fully successful match between the requested URL and any list items, then if the list is unfriendly the request is not acceptable and if the list is friendly, the request is forwarded appropriately to the next proxy server or destination web server. On the other hand, if no match is found then if the list is friendly the request will be denied and if the list is unfriendly the request will be accepted and processed appropriately. This step is called domain authentication within the first proxy server's (Gargoyle's) main processing thread. By a "partially successful match" is meant the following: let us say that the letter string "SEX" is in the unfriendly outbound list, if one of the requested URL has those letters in even part of the URL, it will trigger a successful match outcome.

If the request is approved based on these rules the request is forwarded and if rejected the request is either terminated or re-routed without the knowledge of the user to an alternative or replacement destination link. Where the request is not blocked, the fifth step is that the request goes to the Internet in one of two ways. The first way is direct Internet and it is described in detail in FIG. 3A—the request goes directly to a LAN or a network line. The second way is by dialup modem and is depicted in FIG. 3B.

Figure 1B:
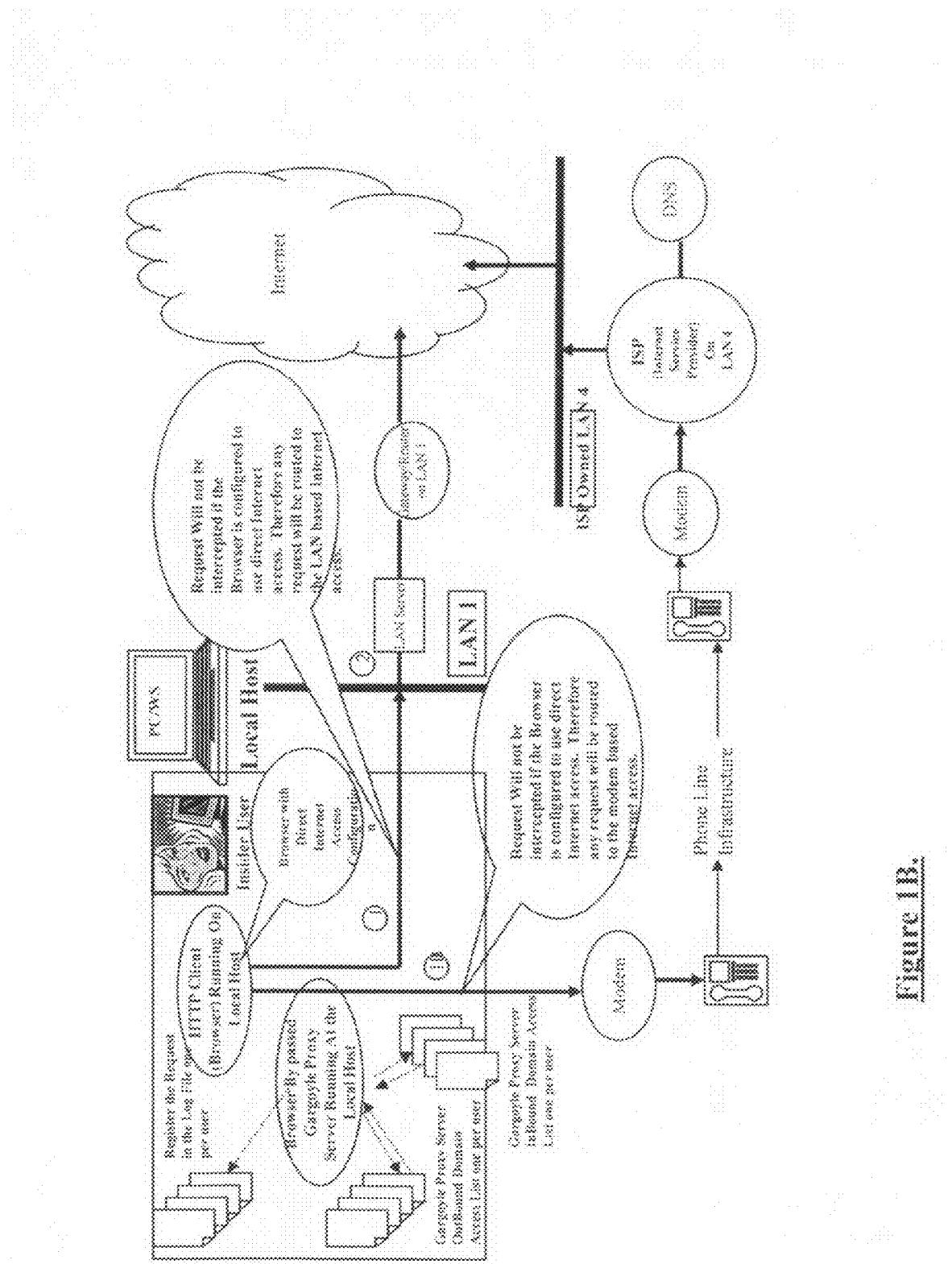
FIG. 1B shows the bypassing of the system.

FIG. 1B is generally similar to FIG. 1A except that in FIG. 1B the hypothetical user is seen to bypass the system of the present invention by virtue of the fact that the user reconfigured the browser so that it does not make use of the first proxy server. Note that in FIG. 1B Gargoyle is not in the path to the Internet. This bypass problem is relevant for any user that is not a child so young that it cannot do this. Furthermore, the system of the present invention solves this problem by means of the use of double proxy servers, as described in further detail in FIGS. 4A, 4B and 5A, 5B. As seen in FIG. 1A, this variation is suitable for children who could not reconfigure the web browsers to use direct network access without the first proxy server, which is a firewall system proxy server. As seen in FIG. 1B, existing browsers such as Netscape Navigator or Microsoft Explorer are simply configured to use the direct Internet access.

Figure 2:
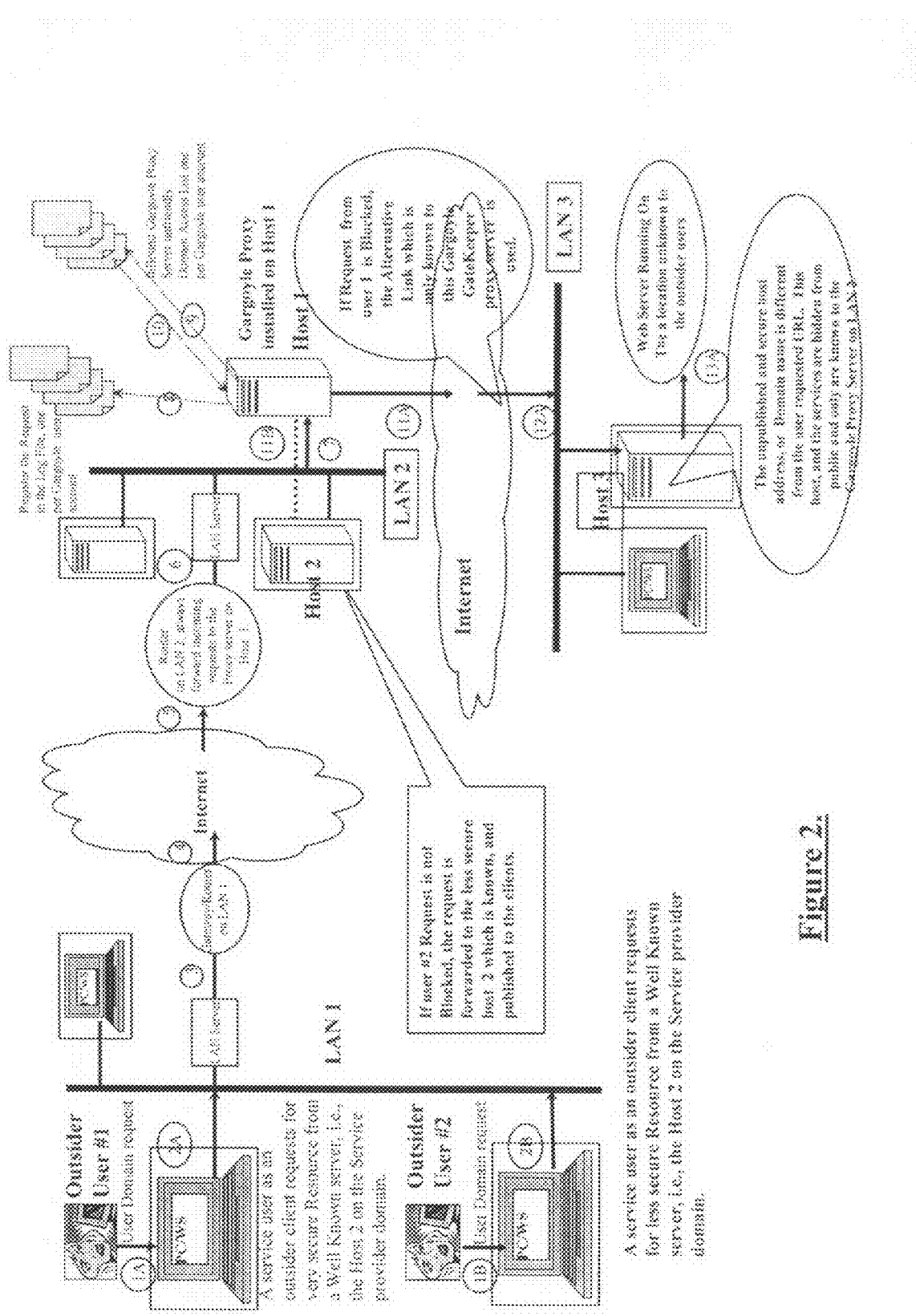
FIG. 2 shows the interception of inbound requests to protect internal resources.

FIG. 2 shows the system's interception of Inbound HTTP Requests to protect internal resources of the system. The address of servers having highly sensitive resources is unpublished and requests are sent to a server with a published address having no significant resources. Before that happens, however, the request is first sent by the system to the first proxy server to be checked against the friendly or unfriendly list. If the proxy server simply checked the requests for approval and allowed through those requests that are from paid users who are supposed to get approved for access to the resources, then the resource web site's address would have to be published. The result would be that highly sensitive resources would be vulnerable to access by intruders who "hack" into the web site and obtain the sensitive information.

Instead, as seen in FIG. 2 in accordance with the system of the present invention, the inbound filtering system operates in a reverse manner. The actual location of the highly sensitive resources are located in an unpublished location. That location is the replacement or alternative location to which are rerouted requests rejected by the system's first proxy server. Therefore, users that paid for access to the premium highly sensitive documents ("approved users") and who should get approved for access are listed by their trusted host name in the proxy server's "unfavorite" or "unfriendly" inbound list. As a result, the proxy server bounces the user' URL request to the alternative/replacement default location at the unpublished address having the resources. Conversely, users who did not pay for premium access ("unapproved users") and who need to be rejected for highly sensitive access are assumed by the proxy server to be "friendly" or "favorite" and have their URL request approved. But that approval means that their request is sent to the host that has the published address and that host does not in fact contain the sensitive information but instead contains harmless information. Consequently, inbound access to sensitive information is monitored and filtered.

Figure 3A:
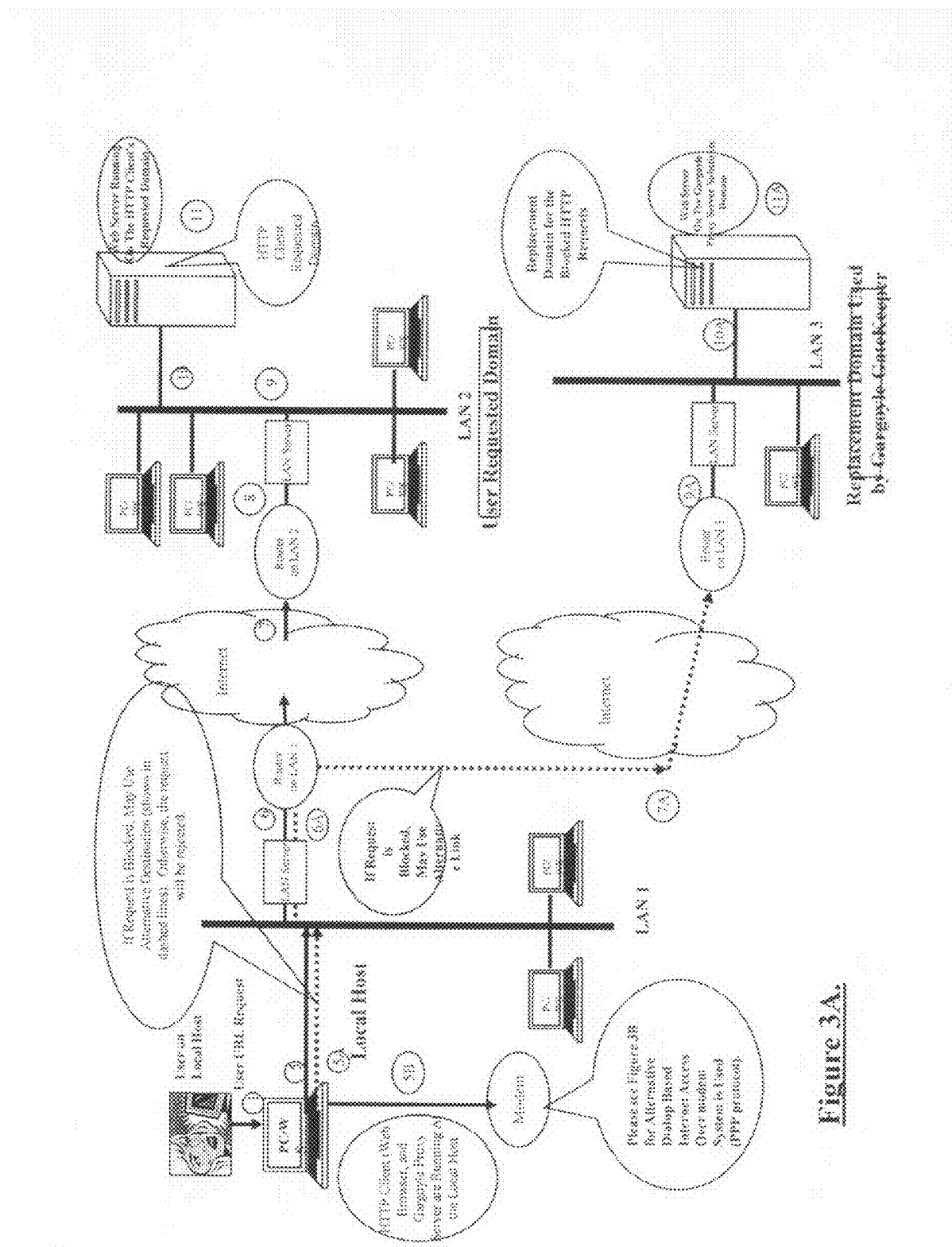
FIG. 3A shows interception of outbound HTTP Requests without proxy chaining with network line access.
Figure 3B:
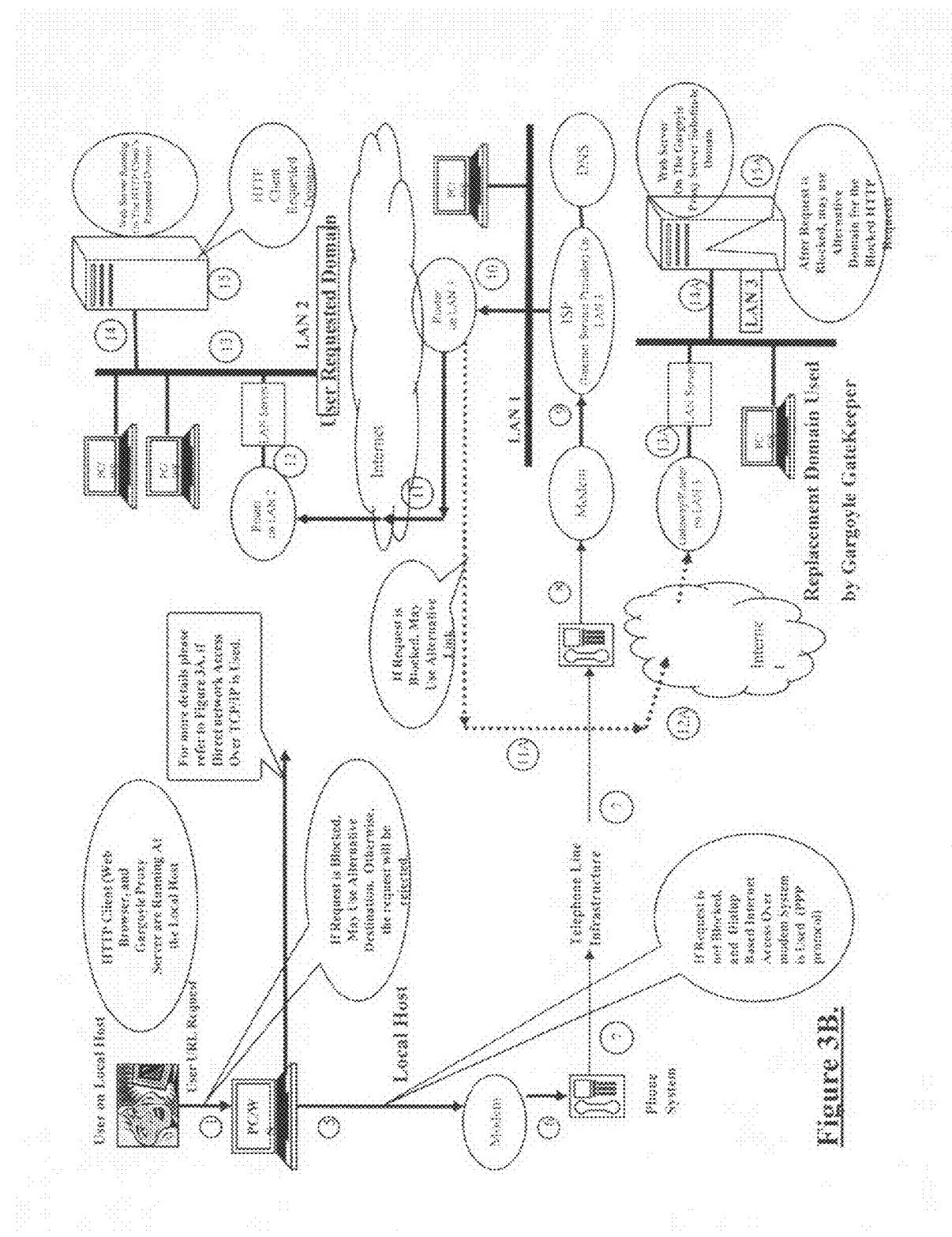
FIG. 3B shows the same as FIG. 3A except for dialup modem connections.

FIGS. 3A and 3B describe the monitoring of outbound communications without the use of proxy chaining to ensure that the users do not bypass the system's first proxy server. This solution is appropriate for very small children who cannot reconfigure their browser to bypass Gargoyle. FIG. 3A is for direct Internet access and FIG. 3B is for dialup modem access to the Internet. This system, which is without the additional proxy server, can be fairly effective only for children within certain ages in filtering outbound requests because few children know how to disable the browser's configuration to connect to the Internet directly and few know how to configure their browser's proxy configuration. In FIG. 3A, the Gargoyle proxy server is installed on every computer in the LAN1. Where a request is blocked it may be rerouted to an alternative web site or simply terminated. If re-routed the user will be unaware that it was rerouted.

Figure 4A:
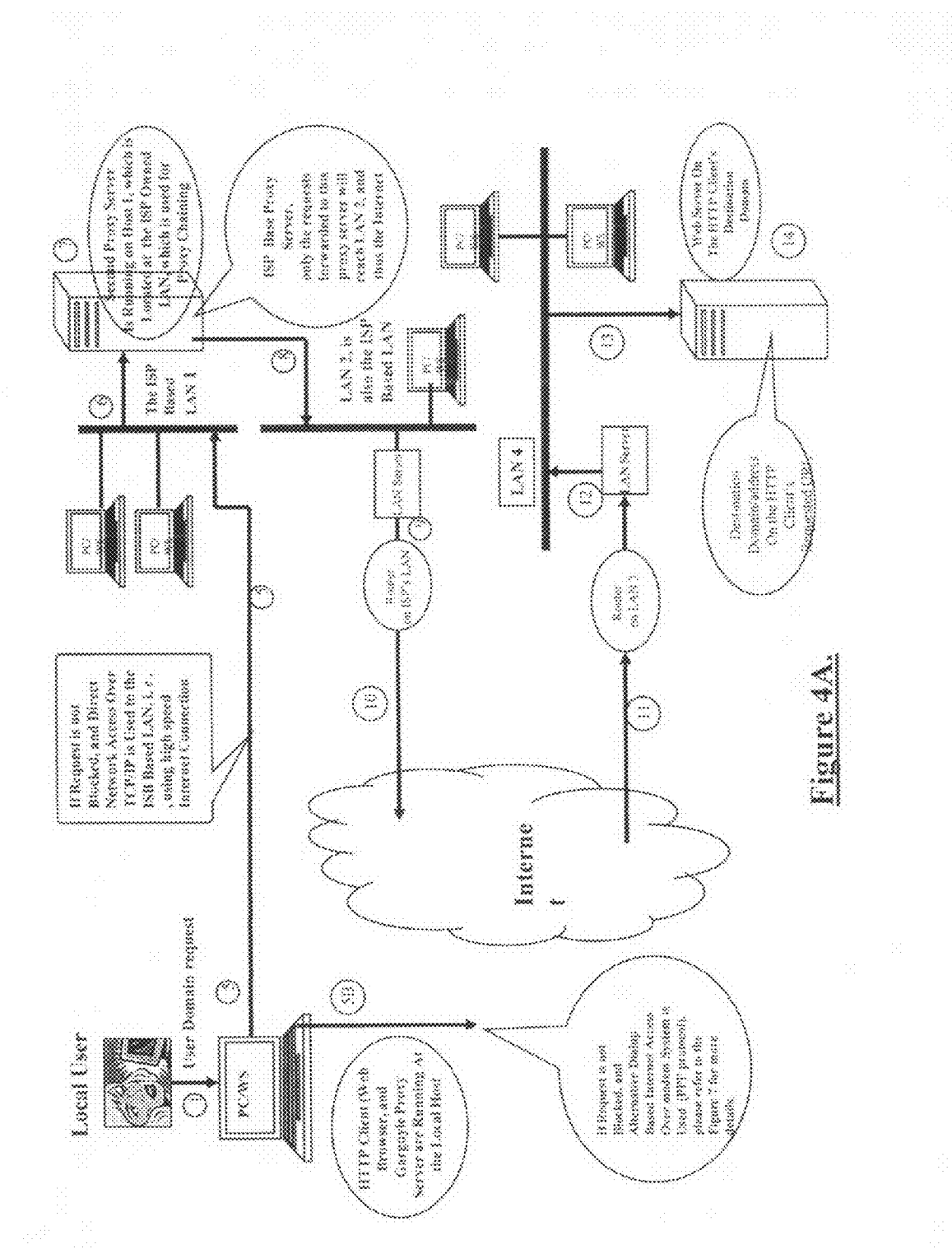
FIG. 4A shows the use of proxy chaining for outbound interception enforcement for single users with network line access

FIG. 4A shows the use of proxy chaining to improve security further for outbound communications by a single user using interception enforcement. In order to create the most tamper-proof web-based Internet access monitoring system for general users, the systems' first proxy server can provide the complete personalized filtering system for the entire family. The solution is based on using two or more interconnected HTTP proxy servers. The first proxy server is the firewall system (Gargoyle) and is configured to be connected to another HTTP proxy server. The second proxy server can also be a firewall system proxy server but with empty unfriendly outbound access list ("unfriendly outbound list"). This is called proxy chaining. The key to the successful operation is that the Internet Protocol address (meaning, the identity) of the computer that hosts the second proxy server is unknown to general users and is disclosed and known only to the administrator account user who configures the first proxy server. Only the second HTTP proxy server and no other proxy server is configured to process HTTP communications to the LAN gateway (or router) and thus to the Internet because the second HTTP proxy server is only proxy server that knows the address and location of the LAN gateway (or router).

The first proxy is located either on the LAN (for example LAN1) with respect to the user computer (if one exists) or on the same computer host that the browser is installed and the user is using. The location of the second HTTP proxy server can vary. The second HTTP proxy server may be located on either of the ISP-based LANs, called LAN1 or LAN2. Most commonly, the user computer is connected to the ISP through a modem connection and the first proxy server is installed and configured on this single computer.

The system provides personalized outbound filtering for numerous user's accounts on stand alone or networks of personal computer work stations. Select an ISP who can provide an HTTP proxy based Internet connection either through modem or network line access. Under this system, the only way to connect to the Internet is to first connect to the first proxy server (Gargoyle) and then be forwarded to the ISP-based HTTP proxy server, then to the Internet. The ISP-based proxy Internet Address and port number are provided to the customers (who will be the system administrator) and are not available to the general public.

The HTTP client (the browser) should be configured to use the system's first proxy server (Gargoyle) as its HTTP proxy server located on either the local host or anywhere on the LAN and the first proxy server should be further configured to forward requests to the second proxy server. To do this using the administrative tools, the user just selects to forward the outbound requests to a different proxy server (use the ISP proxy server as the second proxy server) The administrative user creates one anonymous user account with the highest restriction and no administrative roles which is to be used by all users with no valid system accounts and especially young children or general users in public locations, creates a few user accounts with less restricted accounts and no administrative roles for older age children and creates a few user accounts with administrative rights most suitable for parents. Only the user accounts with administrative rights can inspect and see the ISP related configurations. The other users may not reconfigure their HTTP clients (browsers) to directly use the ISP provided proxy server. Consequently, these users have no way of bypassing the first proxy server and get Internet access without any filtering mechanism. The system administrative tools will hide the ISP proxy location and thereby thwart any users who try to bypass the first proxy server. Furthermore, the location of the LAN gateway (or router) is unknown to all web users and all the proxy servers except the second proxy server.

Figure 4B:
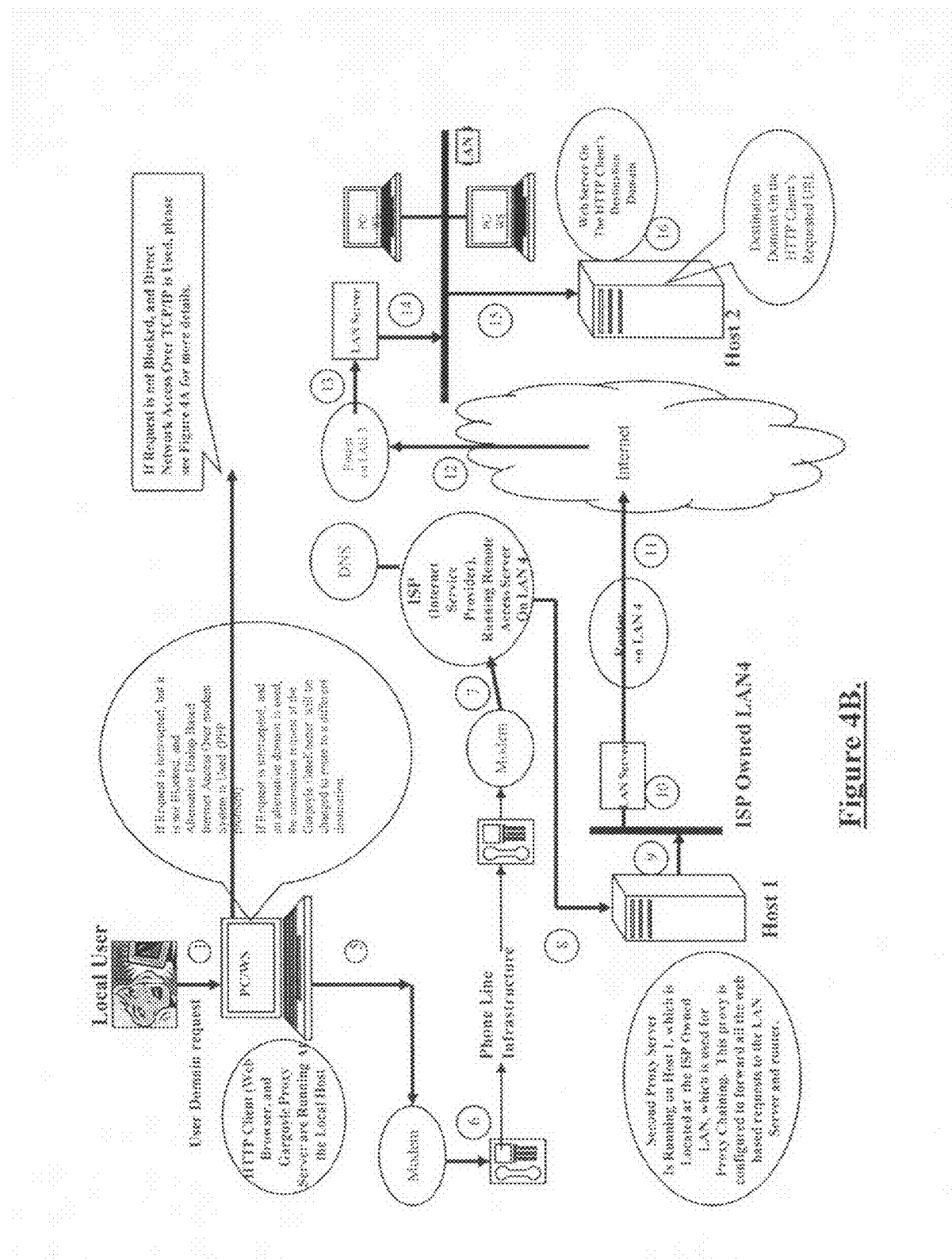
FIG. 4B shows the use of proxy chaining for outbound interception enforcement for single users with dialup modem connections.

The system's first proxy server delegates client's HTTP requests to other proxy servers. To avoid extra costs of having your own second proxy server, the second proxy server is located in the Internet Service Provider ("ISP"). Now since the address of that second proxy server is listed in Gargoyle but not otherwise known to the user, if the user bypasses the first proxy server that user will still not know the address of the ISP proxy server and consequently still will not be able to get network access through the ISP or to the ultimate URL requested. While FIG. 4A is for direct Internet access, FIG. 4B is the same but it is for the situation where there is dialup modem access to the Internet.

Figure 5A:
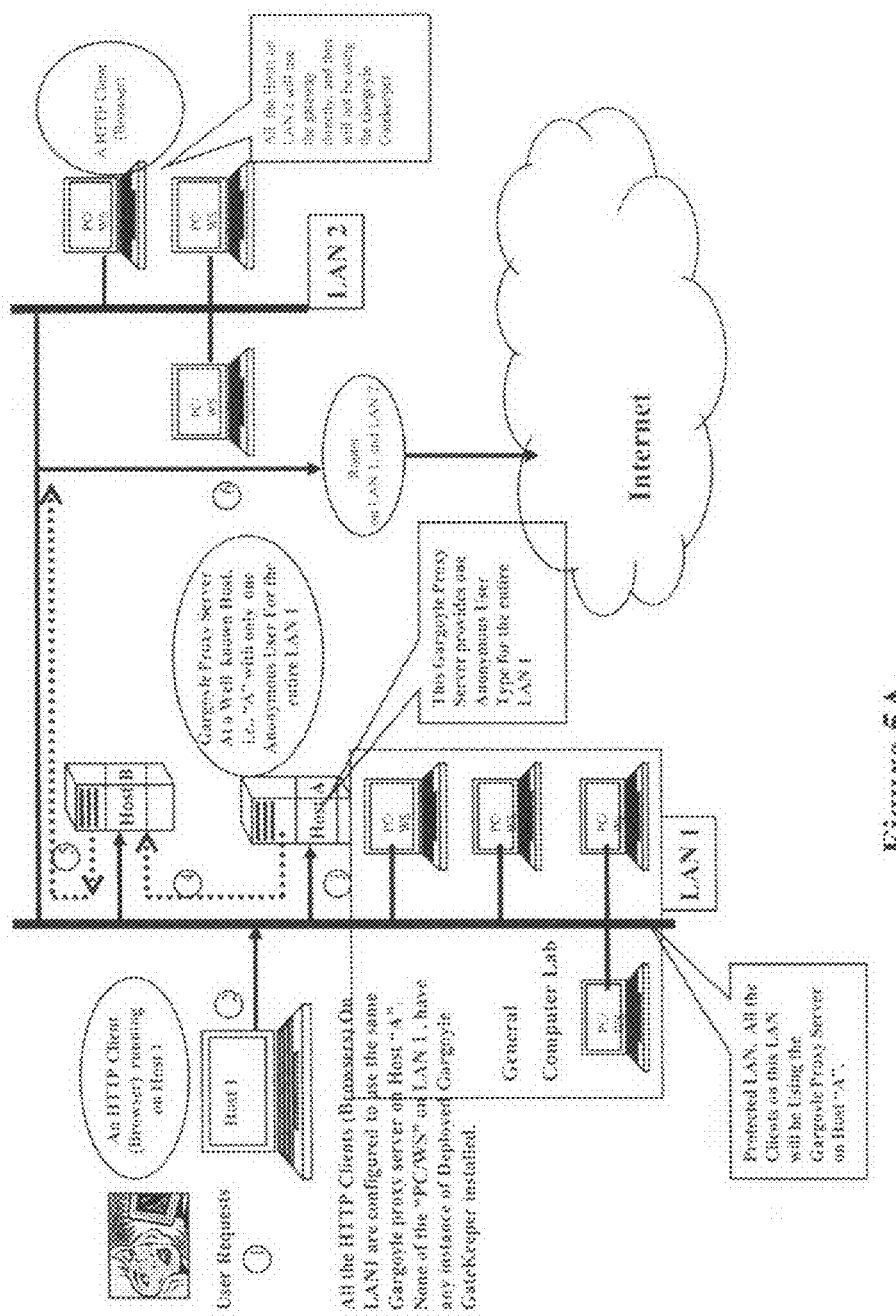
FIG. 5A shows the use of proxy chaining with one deployed Gargoyle or first proxy server for outbound interception enforcement for a group of HTTP clients with every web user using the first proxy server's account and having the same level of access and configurations.
Figure 5B:
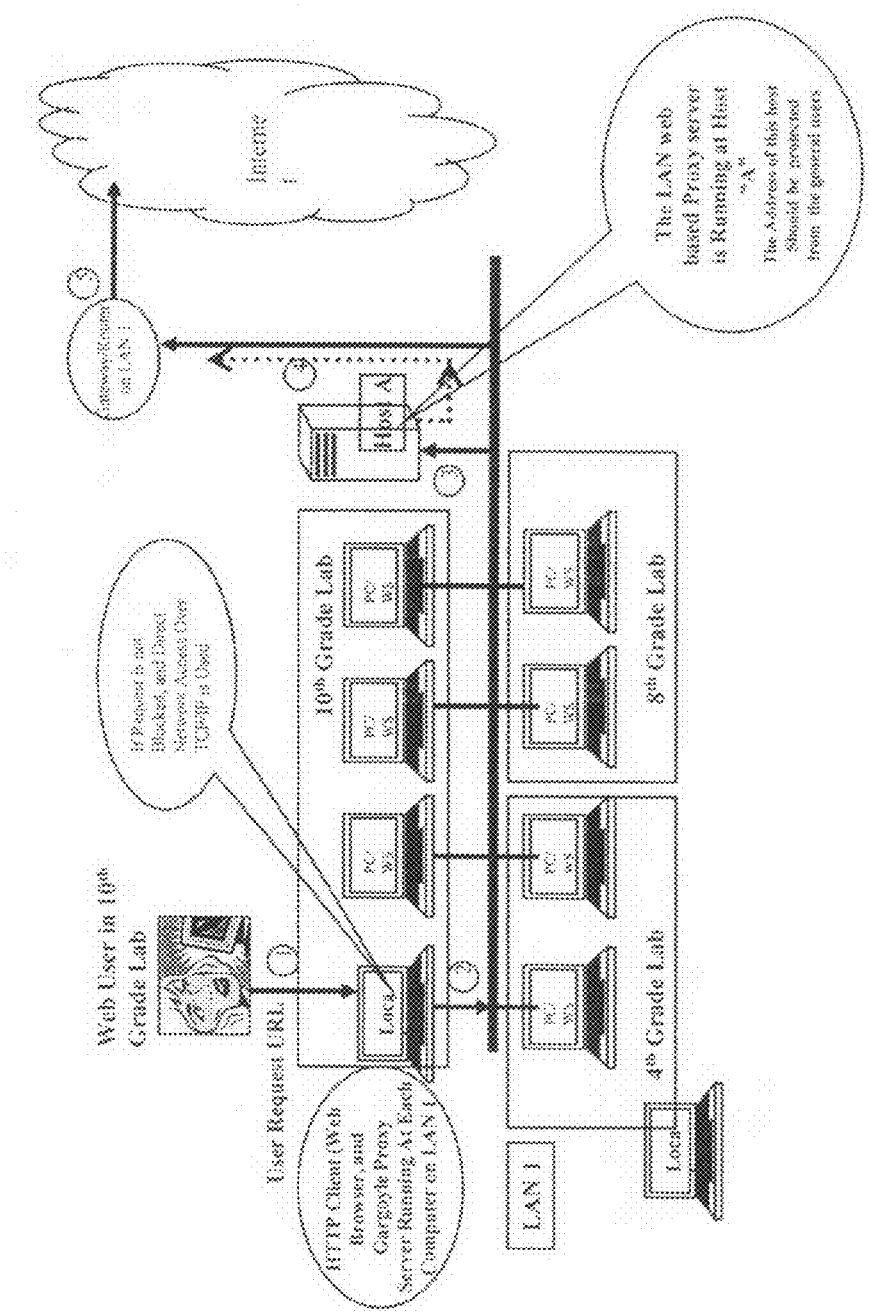
FIG. 5B shows the use of proxy chaining for outbound interception enforcement for a group of HTTP clients with network line access with each computer having its own instance of the system of the present invention deployed and has its own user account and where every user account may have varying levels of access.

FIG. 5B illustrates use of the system in the same manner as FIG. 4A except that FIG. 5B deals with a solution for a group of HTTP clients users rather than for a single user. An example of a group would be a school. In this case, each user computer has a first proxy server (Gargoyle). The second proxy server does not need to be Gargoyle—in other words it does not need to have the friendly and unfriendly list information. It does not need to because the system assumes that any effort by the users to bypass the first proxy server located in the user computer requires the request to be rejected. The second proxy server runs on the host computer system with a secret address unknown to the users and it is located in the LAN in the path to the Internet. The second proxy server may be a firewall proxy of the LAN although not necessarily the first proxy server of the system of the present invention.

FIG. 5B deals with the situation where there are many users in a public computer site such as a public school. As seen in FIG. 5B, the complete personalized filtering system of the present invention provides a similar tamper-proof web-based Internet access monitoring system for public computer sites running many computers on a local LAN. In this case, a local user may request for a URL, and if the URL passes the anonymous user outbound access list (whether friendly or unfriendly), it will be routed to the second proxy server on the LAN before reaching the Internet. The first proxy server, the firewall system proxy server, routes the request only to the known host (as defined by its configuration). This is the only way of accessing the Internet. The first proxy server is installed on every computer of the LAN1. All of them are configured to use proxy forwarding (proxy chaining) at the address and port on the "Host "A"" acting as a gateway.

On occasion the user computers upon connection to the network may receive a dynamic IP address. This dynamically allocated IP address does not affect the internal client since the browser is configured to use the first proxy server at the IP address 127.0.0.1 rather than a particular IP address. Furthermore, the first proxy server will also identify the internal client by comparing incoming client IP address and local host address. If those two addresses are the same, the client is an internal client and the outbound list will be used for security interception.

All the browsers are also configured to access the first proxy server by the unique static Internet Protocol ("IP") address of their computer or by using local host IP address 127.0.0.1 for dynamically allocated IP addresses. Also the browsers are configured to access the selected port number on which the first proxy server's main thread is tending to the client requests. Any other attempt to reach the Internet will fail since the browser users are not aware of the address of "Host "A"" and therefore they cannot reach the Internet directly.

The second proxy server is configured to forward the incoming requests to the router or gateway, and further to the Internet. In some LAN setups although not the one shown in FIG. 5B, the host where the second proxy server is running may have two network cards configured with two distinct IP addresses for network connectivity, one being connected to the LAN 1, and the other to the Internet.

FIG. 5A also deals with a group of HTTP clients but is different from FIG. 5B. Unlike FIG. 5B, FIG. 5A has the Gargoyle proxy server not in each student's workstation computer but rather in the path to the Internet. Consequently, every user (student) has the same list and the same level of access provided through one single user account under which Gargoyle will be launched.

Figure 6:
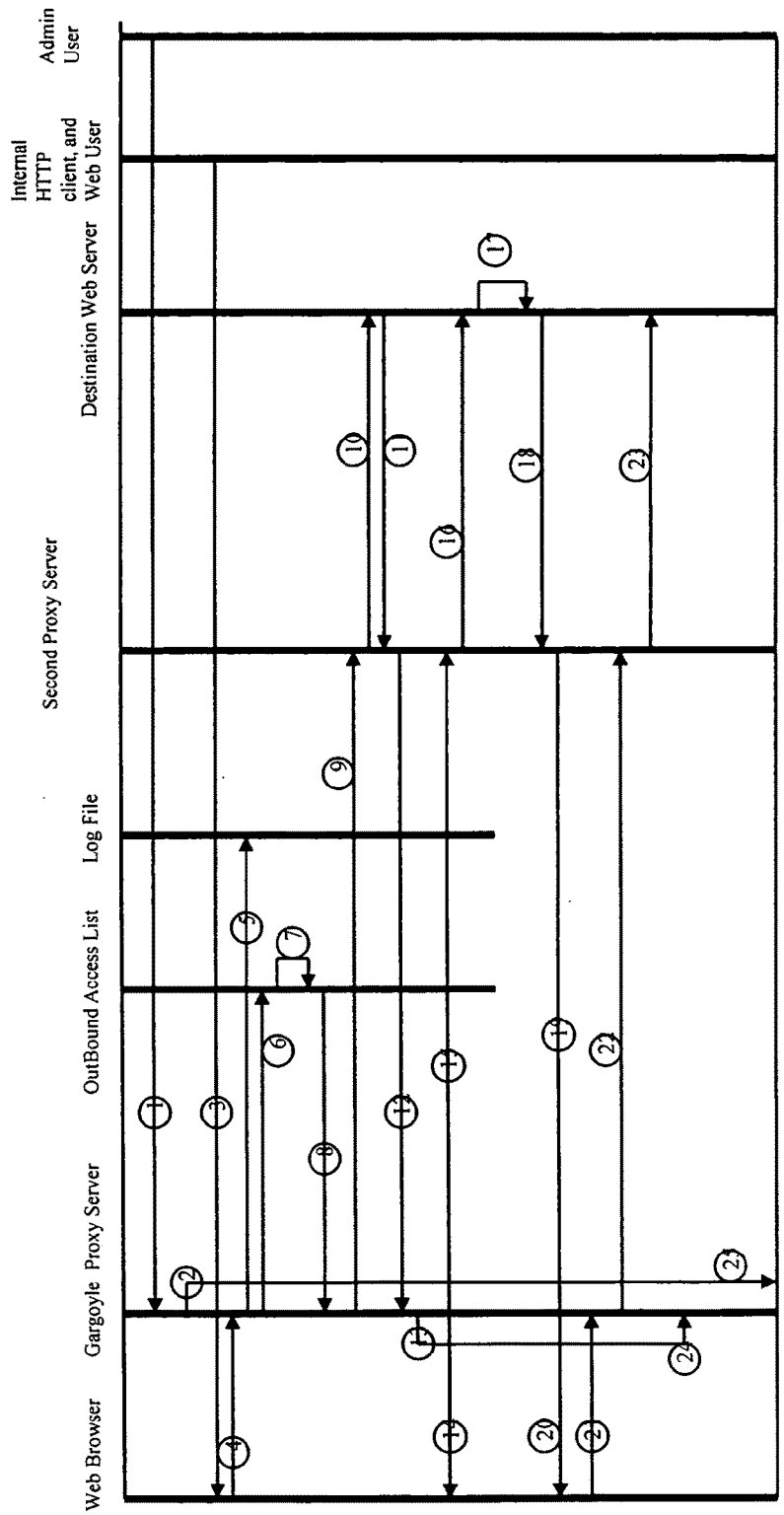
FIG. 6 shows a diagram of a sequence of events when outbound communications depicted as in FIGS. 1A and 4A are intercepted and then approved and forwarded.

FIG. 6 (which refers to outbound communications as depicted in FIGS. 1A and 4A) shows a diagram of a sequence of technical events that occur whenever outbound communications of one request by any system are intercepted and then approved and forwarded. In both FIG. 6 and FIG. 7, time runs forward from the top of the Figure to the bottom of the Figure and each of the arrows represents an event or step that occurs while using the system of the present invention. The beginning of each arrow indicates who or what initiates the event.

Each step of FIG. 6 is represented by a numeral. Numeral 1 shows that the user launches the first proxy server (Gargoyle) at a known port and host. Numeral 2 shows the first proxy server thread waiting for HTTP client socket connections. Numeral 3 shows the user entering the URL on his web browser and sending the request by clicking on the "Enter" key. Numeral 4 shows the first proxy server's socket accepting the HTTP client (browser) connection request where the HTTP client opens a client socket and forwards its request to the first proxy server. Numeral 5 shows the first proxy server registering the request in a logfile (one logfile per user account). Steps 6, 7 and 8 are the domain authentication. Between numeral 4 through numeral 6 the first proxy server uses the incoming client address to identify if this is an outbound request or an inbound request. If the requesting client address is the one which is uniquely configured to be the protected host IP address in the user account or it is the same as the local host IP address, the first proxy server will identify that client as an internal client, and the request is identified as outbound request. Otherwise, it will use the inbound access list. If a communication originates from an inbound client it is called an "outbound communication" and uses the outbound access list; if not it is called an "inbound communication" and uses the inbound access list.

In FIG. 6, numeral 7 shows the first proxy server uses the outbound access list to find a full or partial match between the client's requested destination URL and the list items. After Numeral 8, the results of comparisons will be used by the first proxy server to decide either to forward or stop the request. Numeral 9 shows the first proxy server will establish a client socket to the destination, or possibly will forward the connection request to the next proxy server in the proxy chaining. Numeral 10 shows the connection request will be forwarded to the destination server. Numeral 11 shows the destination host will grant the connection request and send back the socket handler. Numeral 12 shows the proxy server will forward the socket handler to the first proxy server. Numeral 13 shows the server thread spawns a working thread sub-process and passes these two socket handlers from the client, and to the destination or next proxy server to that thread. Numeral 14 shows that the worker thread will use these two socket handlers to mediate the communication. Numerals 15 and 16 show the HTTP client request has been forwarded to the destination web server. Numeral 17 shows the destination web server will search and allocate the requested resources. Numeral 18 shows the web server will return the resources back to the intermediate proxy servers. Numeral 19 shows the resources are forwarded to the first proxy server. HTTP client will receive the resources as seen by numeral 20. The client closes the communication channel by closing the socket to the system's first proxy server (Gargoyle) as seen by numeral 21. Numeral 22 shows Gargoyle in turn will close the communication channel. Numeral 23 shows all the remaining proxy servers will close their socket connections. Gargoyle stops the working thread as seen by numeral 24. Numeral 25 is the same as numeral 2—the first proxy server thread is waiting for more HTTP client socket connections.

Figure 7:
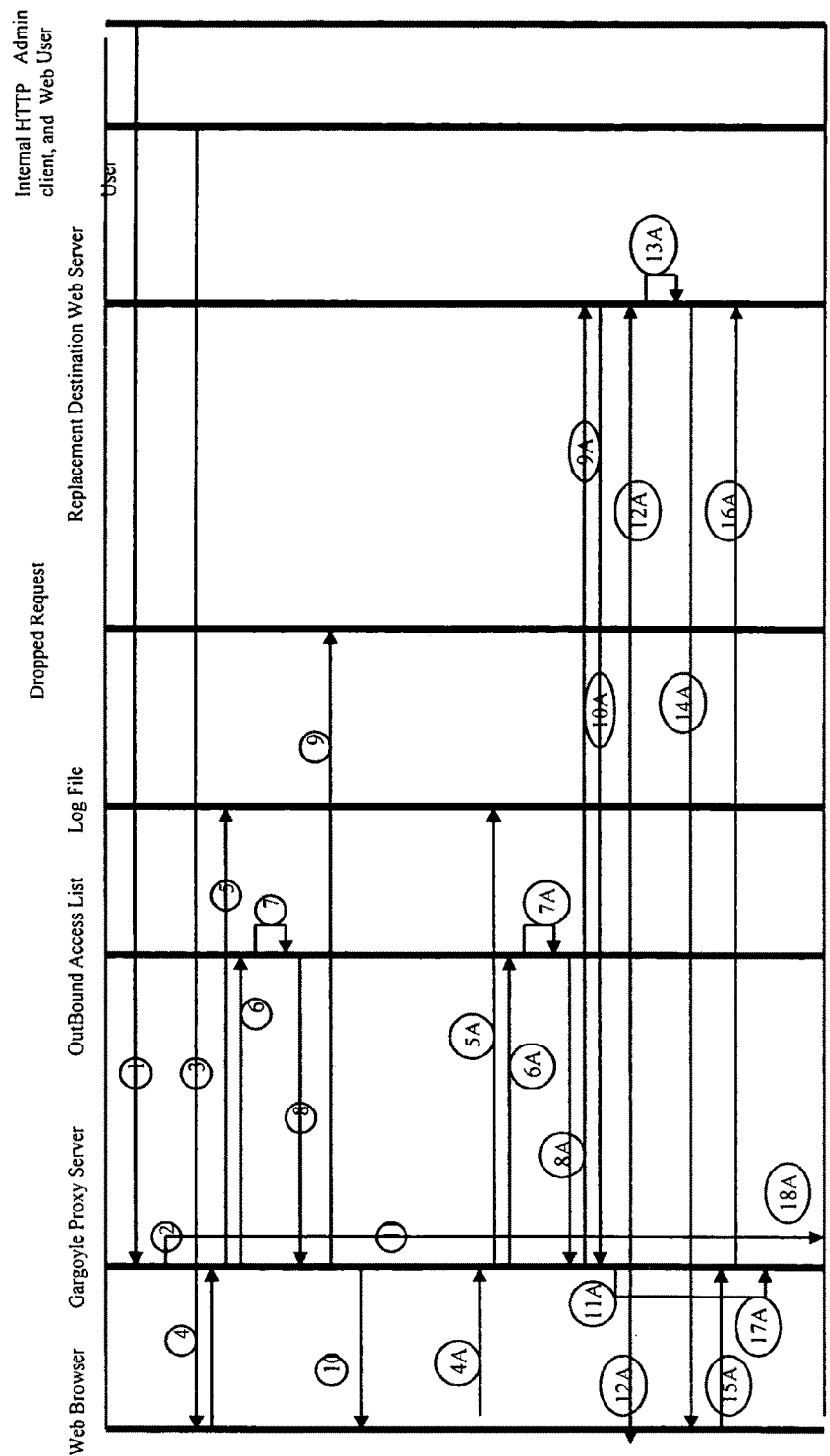
FIG. 7 is a diagram of a sequence of events when outbound communications depicted as in FIGS. 1A and 4A are intercepted and denied and either dropped or forwarded to a replacement URL.

FIG. 7 (which refers to outbound communications that are depicted in FIGS. 1A and 4A) is a diagram of a sequence of events when outbound communications are intercepted and then denied whereupon they are either dropped or forwarded to a predefined friendly replacement URL. In FIG. 7, numerals 1 through 8 (and 4A through 8A) are the same as in FIG. 6 when the outbound communications are approved. Numeral 9 shows the case where Gargoyle uses the security rules (comparing the requested URL against outbound friendly or outbound unfriendly lists) and as a result the HTTP client request is denied and terminated. Numeral 10 shows an error message is created and sent to the HTTP client and that the HTTP client socket is closed by the first proxy server. Numeral 11 shows the first proxy server's main thread continues waiting and listening to incoming requests via the server socket. Numeral 9A shows the first proxy server attempts to connect to the friendly alternative destination host and tries to open a client socket to that server. Numeral 10A shows the new destination host will accept the request and will open a socket for this connection and returns the socket handler. Numeral 11A shows the first proxy server spawns a working thread (sub-process running as a thread) per client request. Numeral 12A shows the server passes these two sockets to the worker (or working) thread, and the worker thread will connect these two sockets from HTTP client to the destination host and web server. The working thread will channel packets from destination to the client. Numeral 13A shows the web server will obtain the requested resources. Numeral 14A shows the destination host will forward these resources to the client through the opened communication path. Numeral 15A shows that after receiving the resources, the client closes the socket. Client will close the connection after facing any networking errors or if the server closes the connection. Numeral 16A shows the proxy server closes the socket to the destination. Numeral 17A shows the main scheduler thread of the first proxy server will stop this thread.

As seen in FIG. 7, denoted by numerals 2, 11 and 18A, the server will continue waiting to accept further requests and will spawn working threads concurrently as many as needed to serve the client requests. Therefore, after the end of any thread life cycle, the main server socket in the first proxy server is open for further client requests.

It is contemplated by the proxy chaining described herein that there can be a third proxy server or even additional proxy servers that forward inbound requests for resources to other proxy servers.

The system of the present invention operates for HTTP communications and is compatible with both telephone lines and direct network lines. The system of the present invention allows use of a friendly list and an unfriendly list for both inbound and outbound communication filtering. The system employs an administrative module which is an interface located in a user computer for configuring a range of access levels applicable to the user. The range of access levels ranges from maximum access, which is 100% full access, to full suspension. The administrative module is capable of creating three types of user accounts that have unique user names and passwords for each account, including (a) an administrator account that is self-configuring, (b) regular accounts with administrative privileges other than the privilege or power to create additional accounts or view information on any other accounts and (c) regular accounts without administrative privileges and in addition a fourth type of user account which is an anonymous guest user account to be used by all general users having no The system of the present invention operates for HTTP communications and is compatible with both telephone lines and direct network lines. The system of the present invention allows use of a friendly list and an unfriendly list for both inbound and outbound communication filtering. The system employs an administrative module which is an interface located in a user computer for configuring a range of access levels applicable to the user. The range of access levels ranges from maximum access, which is 100% full access, to full suspension. The administrative module is capable of creating three types of user accounts that have unique user names and passwords for each account, including (a) an administrator account that is self-configuring, (b) regular accounts with administrative privileges other than the privilege or power to create additional accounts or view information on any other accounts and (c) regular accounts without administrative privileges and in addition a fourth type of user account which is an anonymous guest user account to be used by all general users having no system-based user name or password. The term "self-configuring" used herein simply means having the power to do the configuring on his (the user's) own.

Every instance of launching the first proxy server must be done under a user account recognized by the system of the present invention or under an anonymous guest account. More than one first proxy server can be launched at the same time on the same host computer but one would have to use separate port numbers.

The administrative module includes configuration settings for inbound communications and for outbound communications and has list maintenance functions that including list editing, list deleting, searching of lists, saving of lists, proxy chaining routing, adding and deleting users, interchanging lists and importing lists. Importing of lists means that a user can easily transfer a list of web sites from a flat file into the system's administrative module. Exporting of lists means that after you create the list you can save it in a flat file on the system and you may send it to other users to be used as their lists.

The system of the present invention provides that each user account has the following attributes that can be configured. Any user having administrative privileges can populate an inbound list, can populate an outbound list, determine and select whether a list will be either a friendly list or an unfriendly list. That user can also, if using proxy chaining, define the host address where the next forwarding proxy server is located and that proxy server's port number. For the protection of additional HTTP clients that are not internal clients, one can also select a unique domain name or host IP address to be protected by the same first proxy server and thus treat all HTTP clients from that domain name or from that host address as an internal client. The first proxy server will use this protected address and local host IP address to identify the internal HTTP client and to properly use inbound and outbound lists. One can also select a port number which the first proxy server's main server socket will use to accept the incoming HTTP client request. This is the same port number which was used in the user's browser's proxy configuration.

All information contained or used within the administrative tools or used by the first proxy server is encrypted as an additional security measure.

Although the invention has been described in detail in the foregoing specification and accompanying drawings with respect to various embodiments thereof, these are intended to be illustrative only and not limiting. One skilled in the art will recognize that various modifications and variations may be made therein which are within the spirit and principles of the invention and the scope of the appended claims. It is not desired to limit the invention to the exact description and operation shown and described. The spirit and scope of this invention are limited only by the spirit and scope of the following claims.

What is claimed is:

1. A versatile customizable combination system for providing filtering of outbound requests for access to web sites on the Internet or for controlling inbound requests from the Internet for access to web resources protected by the system, or for filtering both outbound requests for access to web sites on the Internet and controlling inbound requests from the Internet for access to web resources protected by said system, the system having at least one user account, said system comprising:

one or more user computers, wherein each of the said one or more user computers comprises either a dynamically allocated Internet protocol address or a static Internet protocol address;

the one or more user computers comprising one or more hardware processors and comprising memory, wherein the memory stores executable instructions, the executable instructions comprising:

an administrative module, wherein said administrative module includes configuration settings for inbound or outbound communications, wherein said administrative module is located in one of the one or more user computers, wherein said administrative module configures one or more different access levels, and wherein said administrative module is configured to create one or more different types of user accounts, wherein each of the said one or more different types of user accounts requires one or more unique authentication credentials;

a first proxy server in at least one of the said one or more user computers;

wherein the first proxy server has access to the world wide web, wherein said first proxy server is configured by the administrative module, wherein said first proxy server further comprises at least one of a friendly outbound list and an unfriendly outbound list per user account, wherein said first proxy server further comprises at least one of a friendly inbound list and an unfriendly inbound list per user account, wherein said first proxy server is programmed to:
 receive a request from said requesting client,
 check one or more identity attributes of said requesting client against one or more of the friendly inbound list and the unfriendly inbound list of a particular user account;
 check the text of a requested URL (uniform resource locator) against one or more of the friendly outbound list and the unfriendly outbound list of the particular user account; and
 either approve said request from said requesting client, terminate said request from said requesting client, or re-route said request from said requesting client;

wherein said requesting client is either an HTTP (Hypertext Transfer Protocol) application or a web browser;

a second proxy server in at least one of the one or more computers;

wherein said second proxy server is placed between said first proxy server and either a resource or the Internet;

wherein said second proxy server does not comprise said administrative module, said friendly inbound list of the particular user account, said friendly outbound list of the particular user account, said unfriendly inbound list of the particular user account, or said unfriendly outbound list of the particular user account;

wherein said second proxy server communicates either with a proxy of a destination or directly to said destination;

wherein said second proxy server further comprises an Internet Protocol address used for proxy forwarding, wherein said Internet Protocol address used for proxy forwarding is set during configuration of said first proxy server, wherein said Internet Protocol address used for proxy forwarding is configurable by either an administrative account or a type of user account with administrative privileges;

wherein said first proxy server forwards said request to said second proxy server if said first proxy server approves said request;

wherein said first proxy server and said second proxy server are in communication with one another through a network communication link.

2. The system of claim 1, wherein when a user logs into said first proxy server and presents said one or more unique authentication credentials, said first proxy server checks an identity of said user.

3. The system of claim 2, wherein upon a successful authentication of said user's identity by said first proxy server, said first proxy server either checks said one or more identity attributes of said requesting client against at least one of said friendly inbound list of the particular user account or said unfriendly inbound list of the particular user account, or else checks said text of said requested URL against at least one of said friendly outbound list of the particular user account or said unfriendly outbound list of the particular user account.

4. The system of claim 2, wherein said first proxy server, upon a failed authentication of said user, will either offer said user an opportunity to login again, deny said request from said requesting client, or re-route said request from said requesting client to replacement resources.

5. The system of claim 2, wherein upon a successful authentication of said user's identity by said first proxy, the said user logs into the system.

6. The system of claim 5, wherein said first proxy server further registers said requests from said requesting client in a logfile of all URLs requested by said user.

7. The system of claim 1, wherein one or more different types of user accounts further includes a type of user account without administrative privileges or the ability to view information on additional user accounts.

8. The system of claim 1, wherein said first proxy server registers said request of said requesting client in a logfile of all URLs requested by said user.

9. The system of claim 1, wherein when said first proxy server comprises both a friendly inbound list and an unfriendly inbound list of the particular user account, only one of said friendly inbound list and said unfriendly inbound list is active in said first proxy server at any given time; and
wherein when said first proxy server comprises both a friendly outbound list and an unfriendly outbound list of the particular user account, only one of said friendly outbound list and said unfriendly outbound list is active in said first proxy server at any given time.

10. The system of claim 1, wherein said administrative module also performs list maintenance functions and wherein said list maintenance functions comprise at least one of list editing, list deleting, searching of lists, saving of lists, adding and deleting users, interchanging lists, and importing and exporting lists.

11. The system of claim 1, wherein said one or more different types of user accounts includes an administrator account with full configuration rights, said administrative account configured to create additional user accounts.

12. The system of claim 1, wherein said one or more different types of user accounts includes an administrator account with full configuration right without the ability to create additional user accounts.

13. A versatile customizable combination system for providing filtering of outbound requests for access to web sites on the Internet or for controlling inbound requests from the providing for access to web resources protected by said system, or for filtering both outbound requests for access to web sites on the Internet and controlling inbound requests from the Internet for access to web resources protected by said system, said system having at least one user account, said system comprising:
one or more user computers, wherein each of the said one or more user computers comprises either a dynamically allocated Internet protocol address or a static Internet protocol address;
the one or more user computers comprising one or more hardware processors and comprising memory, wherein the memory stores executable instructions, the executable instructions comprising:
an administrative module;
wherein said administrative module includes configuration settings for inbound or outbound communications;
wherein said administrative module includes configuration settings for inbound or outbound communications;
wherein said administrative module is located in one of the one or more user computers,
wherein said administrative module configures one or more different access levels, and
wherein said administrative module is configured to create one or more different types of user accounts, wherein each of the said one or more different types of user accounts requires one or more unique authentication credentials;
a first proxy server in at least one of the said one or more user computers;
wherein the first proxy server has access to the world wide web;
wherein said first proxy server is configured by the administrative module;
wherein said first proxy server further comprises at least one of a friendly outbound list and an unfriendly outbound list per user account;
wherein said first proxy server further comprises at least one of a friendly inbound list and an unfriendly inbound list per user account, wherein said first proxy server is programmed to:
receive a request from said requesting client,
check one or more identity attributes of said requesting client against one or more of the friendly inbound list of a particular user account and the unfriendly inbound list of the particular user account;
check the text of a requested URL against one or more of the friendly outbound list of the particular user account and the unfriendly outbound list of the particular user account; and
either approve said request from said requesting client, terminate said request from said requesting client, or re-route said request from said requesting client;
wherein said requesting client is either an HTTP (Hypertext Transfer Protocol) client application or a web browser.

14. The system of claim 13, wherein said one or more different types of user accounts may be configured with access levels ranging from no access to all access.

15. The system of claim 13, wherein said first proxy server further registers said requests from said requesting client in a logfile of all URLs requested by a user.

16. The system of claim 13, wherein said one or more user computers further comprise said first proxy server in all of said one or more user computers.

17. The system of claim 13, wherein said one or more different types of user accounts are configured with access levels ranging from no access to all access.

18. The system of claim 13, wherein said system is used with a dialup modem connection to the Internet, a local area network, or a virtual network connection.

19. The system of claim 18, wherein said one or more different types of user accounts are configured with access levels ranging from no access to all access.

20. The system of claim 13, wherein said one or more different types of user accounts further includes an anonymous guest user account, wherein the anonymous guest user account is for use by general users without authentication credentials.

21. The system of claim 20, wherein when said user presents said one or more unique authentication credentials, said first proxy server checks an identity of said user.

22. The system of claim 21, wherein said first proxy server further registers said requests from said requesting client in a logfile of all URLs requested by said user.

23. The system of claim 21, wherein upon a successful authentication of said user's identity by said first proxy server, said first proxy server uses said user's account to either check said one or more identity attributes of said requesting client against at least one of said friendly inbound list of the particular user account or said unfriendly inbound list of the particular user account, or to check said text of said requested URL against at least one of said friendly outbound list of the particular user account or said unfriendly outbound list of the particular user account.

24. The system of claim 21, wherein if said first proxy server fails to authenticate said user, said first proxy server offers said user an opportunity to log in as an anonymous guest user.

25. The system of claim 13, wherein, in inbound communications, if said request from said requesting client is rejected by said first proxy server, said request is forwarded to a replacement location of said resource, wherein an actual location of said replacement location is an unpublished location when said user considers said resource to be sensitive;
   wherein said one or more identity attributes of requesting clients of approved users are listed in said unfriendly inbound list of the particular user account;
   wherein said requests from said requesting clients of approved users are sent by said first proxy server to said replacement location;
   wherein said one or more identity attributes of said requesting clients of an unapproved user are not listed in said unfriendly inbound list of the particular user account;
   wherein said requests of said requesting clients of unapproved users are sent to a published address containing information that said user considers unimportant.

26. The system of claim 25, wherein said first proxy server registers said request of said requesting client in a logfile of all URLs requested by said user.

27. The system of claim 13, wherein when a user presents said one or more unique authentication credentials, said first proxy server checks an identity of said user.

28. The system of claim 27, wherein upon a successful authentication of said user's identity by said first proxy server, said first proxy server uses said user's account to either check said identity attributes of said requesting client against at least one of said friendly inbound list of the particular user account or said unfriendly inbound list of the particular user account, or to check said text of said requested URL against at least one of said friendly outbound list of the particular account or said unfriendly outbound list of the particular user account.

29. The system of claim 27, wherein said first proxy server, upon a failed authentication of said user, will either offer said user an opportunity to login again, deny said request from said requesting client, or re-route said request from said requesting client to replacement resources.

30. The system of claim 27, wherein upon a successful authentication of said user's identity by said first proxy server, the said user logs into the system.

31. The system of claim 13, wherein, in inbound communications, if said request from said requesting client is rejected by said first proxy server, said request is forwarded to a replacement location of said resource, wherein an actual location of said replacement location is an unpublished location when said user considers said resource to be sensitive;
   wherein said identity attributes of requesting clients of an approved user are not listed in said friendly inbound list of the particular user account;
   wherein said requests of said requesting clients of approved users are sent by said first proxy server to said replacement location;
   wherein said one or more identity attributes of said requesting clients of an unapproved user are listed in said friendly inbound list of the particular user account;
   wherein said requests of said requesting clients of said unapproved users are sent to a published address containing information that said user considers unimportant.

32. The system of claim 31, wherein when said user presents said one or more unique authentication credentials, said first proxy server checks an identity of said user.

33. The system of claim 32, wherein if said first proxy server fails to authenticate said user, said first proxy server offers said user an opportunity to log in as an anonymous guest user.

34. The system of claim 13, wherein said one or more different types of user accounts are configured with access levels ranging from no access to all access.

35. The system of claim 13, wherein said system is used with a dialup modem connection to the Internet, a local area network, or a virtual network connection.

36. The system of claim 35, wherein said one or more different types of user accounts is configured with access levels ranging from no access to all access.

37. The system of claim 13, wherein said one or more different types of user accounts further includes a type of user account without administrative privileges or the ability to view information on additional user accounts.

38. The system of claim 13, wherein at least one additional proxy server is communicatively located between said first proxy server and said resource, said at least one additional proxy server comprising executable instructions stored on the memory of the one or more user computers.

39. The system of claim 13, wherein when said first proxy server comprises both a friendly inbound list and an unfriendly inbound list of the particular user account, only one of said friendly inbound list and said unfriendly inbound list is active in said first proxy server at any given time; and
   wherein when said first proxy server comprises both a friendly outbound list and an unfriendly outbound list of the particular user account, only one of said friendly outbound list and said unfriendly outbound list is active in said first proxy server at any given time.

40. The system of claim 13, wherein said administrative module also performs list maintenance functions and wherein said list maintenance functions comprise at least one of list editing, list deleting, searching of lists, saving of lists, adding and deleting users, interchanging lists, and importing and exporting lists.

41. The system of claim 13, wherein said one or more different types of user accounts includes an administrator account with full configuration rights, said administrative account configured to create additional user accounts.

42. The system of claim 13, wherein said one or more different types of user accounts includes an administrator account with full configuration right without the ability to create additional user accounts.

43. A versatile customizable combination system for providing filtering of outbound requests for access to web sites on the Internet or for filtering both outbound requests and inbound requests from the providing for access to web resources protected by said system, said system having at least one user account, said system comprising:
  one or more user computers, wherein each of the said one or more user computers comprises either a dynamically allocated Internet protocol address or a static Internet protocol address;
  the one or more user computers comprising one or more hardware processors and comprising memory, wherein the memory stores executable instructions, the executable instructions comprising:
  an administrative module;
  wherein said administrative module includes configuration settings for inbound or outbound communications;
  wherein said administrative module is located in one of the one or more user computers,
  wherein said administrative module configures one or more different access levels, and
  wherein said administrative module is configured to create one or more different types of user accounts, wherein each of the said one or more different types of user accounts requires one or more unique authentication credentials;
  a first proxy server in at least one of the said one or more user computers;
  wherein the first proxy server has access to the world wide web;
  wherein said first proxy server is configured by the administrative module;
  wherein said first proxy server further comprises at least one of a friendly outbound list and an unfriendly outbound list per user account;
  wherein when said first proxy server comprises both a friendly outbound list and an unfriendly outbound list of a particular user account, only one of said friendly outbound list and said unfriendly outbound list of the particular user account is active in said first proxy server at any given time;
  wherein said first proxy server is programmed to:
    receive a request from said requesting client,
    check the text of a requested URL against one or more of the friendly outbound list of the particular user account and the unfriendly outbound list of the particular user account; and
    either approve said request from said requesting client, terminate said request from said requesting client, or re-route said request from said requesting client;
  wherein said requesting client is either an HTTP (Hypertext Transfer Protocol) client application or a web browser.

44. The system of claim 43, wherein said one or more different types of user accounts further includes an anonymous guest user account, wherein the anonymous guest user account is for use by general users without authentication credentials.

45. The system of claim 44, wherein when a user's one or more unique authentication credentials are presented, said first proxy server checks an identity of said user.

46. The system of claim 45, wherein upon a successful authentication of said user's identity by said first proxy server, said user logs into the system.

47. The system of claim 44, wherein if said first proxy server fails to authenticate said user, said first proxy server offers said user an opportunity to log in as an anonymous guest user.

48. The system of claim 44, wherein said first proxy server further registers said requests from said requesting client in a logfile of all URLs requested by said user.

49. The system of claim 43, wherein said one or more different types of user accounts are configured with access levels ranging from no access to all access.

50. The system of claim 43, wherein said system is used with a dialup modem connection to the Internet, a local area network, or a virtual network connection.

51. The system of claim 50, wherein said one or more different types of user accounts are configured with access levels ranging from no access to all access.

52. The system of claim 43, wherein said first proxy server further registers said requests from said requesting client in a logfile of all URLs requested by said user.

53. The system of claim 43, wherein when a user's one or more unique authentication credentials are presented, said first proxy server checks an identity of said user.

54. The system of claim 53, wherein upon a successful authentication of said user's identity by said first proxy server, said first proxy server uses said user's account to check said text of said requested URL at least one of said friendly outbound list of the particular user account or said unfriendly outbound list of the particular user account.

55. The system of claim 53, wherein said first proxy server, upon a failed authentication of said user, will either offer said user an opportunity to login again, deny said request from said requesting client, or re-route said request from said requesting client to replacement resources.

56. The system of claim 43, wherein said one or more different types of user accounts further includes a type of user account without administrative privileges or the ability to view information on additional user accounts.

57. The system of claim 43, wherein at least one proxy server is communicatively located between said first proxy server and said resource, said at least one additional proxy server comprising executable instructions stored on the memory of the one or more user computers.

58. The system of claim 43, wherein said administrative module also performs list maintenance functions and wherein said list maintenance functions comprise at least one of list editing, list deleting, searching of lists, saving of lists, adding and deleting users, interchanging lists, and importing and exporting lists.

59. The system of claim 43, wherein said one or more different types of user accounts includes an administrator account with full configuration rights, said administrative account configured to create additional user accounts.

60. The system of claim 43, wherein said one or more different types of user accounts includes an administrator account with full configuration right without the ability to create additional user accounts.

61. A versatile customizable combination system for providing filtering of outbound requests for access to web sites on the Internet or for filtering both inbound requests for access to web resources protected by said system and for outbound requests, said system having at least one user account, said system comprising:
- one or more user computers, wherein each of the said one or more user computers comprises either a dynamically allocated Internet protocol address or a static Internet protocol address;
- the one or more user computers comprising one or more hardware processors and comprising memory, wherein the memory stores executable instructions, the executable instructions comprising:
- an administrative module;
- wherein said administrative module includes configuration settings for inbound or outbound communications;
- wherein said administrative module is located in one of the one or more user computers,
- wherein said administrative module configures one or more different access levels, and
- wherein said administrative module is configured to create one or more different types of user accounts wherein each of the said one or more different types of user accounts requires one or more unique authentication credentials;
- a first proxy server in at least one of the said one or more user computers;
- wherein the first proxy server has access to the world wide web;
- wherein said first proxy server is configured by the administrative module;
- wherein said first proxy server further comprises at least one of a friendly outbound list and an unfriendly outbound list per user account;
- wherein when said first proxy server comprises both a friendly outbound list and an unfriendly outbound list of a particular user account, only one of said friendly outbound list and said unfriendly outbound list of the particular user account is active in said first proxy server at any given time;
- wherein said first proxy server is programmed to:
  - receive a request from said requesting client,
  - check said text of a requested URL (uniform resource locator) against one or more of the friendly outbound list of the particular user account and the unfriendly outbound list of the particular user account;
  - either approve said request from said requesting client, terminate said request from said requesting client, or re-route said request from said requesting client;
- wherein said requesting client is either an HTTP (Hypertext Transfer Protocol) client application or a web browser;
- a second proxy server in at least one of the one or more computers;
- wherein said second proxy server is placed between said first proxy server and either a resource or the Internet;
- wherein said second proxy server does not comprise said administrative module, said friendly outbound list of the particular user account, or said unfriendly outbound list of the particular user account;
- wherein said second proxy server communicates either with a proxy of a destination or directly to said destination;
- wherein said second proxy server further comprises an Internet Protocol address used for proxy forwarding, wherein said Internet Protocol address used for proxy forwarding is set during configuration of said first proxy server, wherein said Internet Protocol address used for proxy forwarding is configurable by either an administrative account or a type of user account with administrative privileges;
- wherein said first proxy server forwards said request to said second proxy server if said first proxy server approves said request;
- wherein said first proxy server and said second proxy server are in communication with one another through a network communication link.

62. The system of claim 61, wherein said one or more different types of user accounts further includes an anonymous guest user account, wherein the anonymous guest user account is for use by general users without authentication credentials.

63. The system of claim 62, wherein when a user's one or more unique authentication credentials are presented, said first proxy server checks an identity of said user.

64. The system of claim 63, wherein upon a successful authentication of said user's identity by said first proxy server, said first proxy server uses said user's account to check said text of said requested URL at least one of said friendly outbound list of the particular user account or said unfriendly outbound list of the particular user account.

65. The system of claim 63, wherein if said first proxy server fails to authenticate said user, said first proxy server offers said user an opportunity to log in as an anonymous guest user.

66. The system of claim 63, wherein said first proxy server further registers said requests from said requesting client in a logfile of all URLs requested by said user.

67. The system of claim 61, wherein said one or more different types of user accounts are configured with access levels ranging from no access to all access.

68. The system of claim 61, wherein said system is used with a dialup modem connection to the Internet, a local area network, or a virtual network connection.

69. The system of claim 68, wherein said one or more different types of user accounts are configured with access levels ranging from no access to all access.

70. The system of claim 61, wherein said first proxy server further registers said requests from said requesting client in a logfile of all URLs requested by said user.

71. The system of claim 61, wherein when said user's one or more unique authentication credentials are presented, said first proxy server checks an identity of said user.

72. The system of claim 71, wherein upon a successful authentication of said user's identity by said first proxy server, said first proxy server uses said user's account to check said text of said requested URL at least one of said friendly outbound list of the particular user account, or said unfriendly outbound list of the particular user account.

73. The system of claim 71, wherein said first proxy server, upon a failed authentication of said user, will either offer said user an opportunity to login again, deny said request from said requesting client, or re-route said request from said requesting client to replacement resources.

74. The system of claim 61, wherein at least one additional proxy server is communicatively located between said first proxy server and said resource, said at least one additional proxy server comprising executable instructions stored on the memory of the one or more user computers.

75. The system of claim 61, wherein said multiple types of user accounts further includes a type of user account without administrative privileges or the ability to view information on additional user accounts.

76. The system of claim 61, wherein said administrative module also performs list maintenance functions and wherein said list maintenance functions comprise at least one list editing, list deleting, searching of lists, saving of lists, adding and deleting users, interchanging lists, and importing and exporting lists.

77. The system of claim 61, wherein said one or more different types of user accounts includes an administrator account with full configuration rights, said administrative account configured to create additional user accounts.

78. The system of claim 61, wherein said one or more different types of user accounts includes an administrator account with full configuration right without the ability to create additional user accounts.

79. The system of claim 61, wherein said one or more different types of user accounts includes an administrator account with full configuration rights, said administrative account configured to create additional user accounts.

80. The system of claim 61, wherein said one or more different types of user accounts includes an administrator account with full configuration right without the ability to create additional user accounts.

81. The system of claim 61, wherein said one or more different types of user accounts includes an administrator account with full configuration rights, said administrative account configured to create additional user accounts.

82. The system of claim 61, wherein said one or more different types of user accounts includes an administrator account with full configuration rights but without the ability to create additional user accounts.

83. A versatile customizable combination system for providing filtering of outbound requests for access to web sites on the Internet or for controlling inbound requests for access to web resources protected by said system, or for filtering both outbound requests for access to web sites on the Internet and controlling inbound requests from the Internet for access to web resources protected by said system, said system having at least one user account, the system comprising:
   one or more user computers, wherein each of the said one or more user computers comprises either a dynamically allocated Internet protocol address or a static Internet protocol address;
   the one or more user computers comprising one or more hardware processors and comprising memory, wherein the memory stores executable instructions, the executable instructions comprising:
   an administrative module;
   wherein said administrative module includes configuration settings for inbound or outbound communications;
   wherein said administrative module is located in one of the one or more user computers,
   wherein said administrative module configures one or more different access levels, and
   wherein said administrative module is configured to create one or more different types of user accounts wherein each of the said one or more different types of user accounts requires one or more unique authentication credentials;
   a first proxy server in at least one of the said one or more user computers;
   wherein the first proxy server has access to the world wide web;
   wherein said first proxy server is configured by the administrative module;
   wherein said first proxy server further comprises at least one of a friendly inbound list and an unfriendly inbound list per user account;
   wherein said first proxy server is programmed to:
      receive a request from said requesting client, check said identity attributes of said requesting client against one or more of the friendly inbound list of a particular user account and the unfriendly inbound list of the particular user account;
      either approve said request from said requesting client, terminate said request from said requesting client, or re-route said request from said requesting client;
   wherein said requesting client is either an HTTP (Hypertext Transfer Protocol) application or a web browser.

84. The system of claim 83, wherein said one or more different types of user accounts further includes a type of user account without administrative privileges and without the ability to view information on additional user accounts.

85. The system of claim 83, wherein said one or more different types of user accounts further includes a type of user account without administrative privileges and without the ability to view information on additional user accounts.

86. The system of claim 83, wherein when a user's one or more unique authentication credentials are presented, said first proxy server checks an identity of said user.

87. The system of claim 86, wherein upon a successful authentication of said user's identity by said first proxy server, said first proxy server uses said user's account to check said one or more identity attributes of said requesting client against one or more of the friendly inbound list of the particular user account and the unfriendly inbound list of the particular user account.

88. The system of claim 86, wherein said first proxy server, upon a failed authentication of said user, will either offer said user an opportunity to login again, deny said request from said requesting client, or re-route said request from said requesting client to replacement resources.

89. The system of claim 83, wherein when said first proxy server comprises both a friendly inbound list and an unfriendly inbound list of the particular user account, only one of said friendly inbound list and said unfriendly inbound list is active in said first proxy server at any given time.

90. A versatile customizable combination system for providing filtering of outbound requests for access to web sites on the Internet or for controlling inbound requests for access to web resources protected by said system, or for filtering both outbound requests for access to web sites on the Internet and controlling inbound requests from the Internet for access to web resources protected by said system, said system having at least one user account, said system comprising:
   one or more user computers, wherein each of the said one or more user computers comprises either a dynamically allocated Internet protocol address or a static Internet protocol address;
   the one or more user computers comprising one or more hardware processors and comprising memory, wherein the memory stores executable instructions, the executable instructions comprising:
   an administrative module;
   wherein said administrative module includes configuration settings for inbound or outbound communications;
   wherein said administrative module is located in one of the one or more user computers,
   wherein said administrative module configures one or more different access levels, and
   wherein said administrative module is configured to create one or more different types of user accounts, wherein each of the said one or more different types of user accounts requires one or more unique authentication credentials;

a first proxy server in at least one of the said one or more user computers;
wherein the first proxy server has access to the world wide web;
wherein said first proxy server is configured by the administrative module;
wherein said first proxy server further comprises at least one of a friendly inbound list and an unfriendly inbound list per user account;
wherein said first proxy server is programmed to:
  receive a request from said requesting client,
    check said identity attributes of said requesting client against one or more of the friendly inbound list of a particular user account and the unfriendly inbound list of the particular user account;
    either approve said request from said requesting client, terminate said request from said requesting client, or re-route said request from said requesting client;
wherein said requesting client is either an HTTP (Hypertext Transfer Protocol) application or a web browser;
a second proxy server in at least one of the one or more computers;
wherein said second proxy server is placed between said first proxy server and either a resource or the Internet;
wherein said second proxy server does not comprise said administrative module, said friendly inbound list of the particular user account, or said unfriendly inbound list of the particular user account;
wherein said second proxy server communicates either with a proxy of a destination or directly to said destination;
wherein said second proxy server further comprises an Internet Protocol address used for proxy forwarding, wherein said Internet Protocol address used for proxy forwarding is set during configuration of said first proxy server, wherein said Internet Protocol address used for proxy forwarding is configurable by either an administrative account or a type of user account with administrative privileges;
wherein said first proxy server forwards said request to said second proxy server if said first proxy server approves said request;
wherein said first proxy server and said second proxy server are in communication with one another through a network communication link.

91. The system of claim 90, wherein when a user's one or more unique authentication credentials are presented, said first proxy server checks an identity of said user.

92. The system of claim 91, wherein upon a successful authentication of said user's identity by said first proxy server, said first proxy server uses said user's account to check said one or more identity attributes of said requesting client against one or more of the friendly inbound list of the particular user account and the unfriendly inbound list of the particular user account.

93. The system of claim 91, wherein said first proxy server, upon a failed authentication of said user, will either offer said user an opportunity to login again, deny said request from said requesting client, or re-route said request from said requesting client to replacement resources.

94. The system of claim 90, wherein when said first proxy server comprises both a friendly inbound list and an unfriendly inbound list of the particular user account, only one of said friendly inbound list and said unfriendly inbound list is active in said first proxy server at any given time.

95. A versatile customizable combination system for providing filtering of outbound requests for access to web sites on the Internet or for controlling inbound requests for access to web resources protected by said system, or for filtering both outbound requests for access to web sites on the Internet and controlling inbound requests from the Internet for access to web resources protected by said system, said system having at least one user account, said system comprising:
  one or more user computers, wherein each of the said one or more user computers comprises either a dynamically allocated Internet protocol address or a static Internet protocol address;
  the one or more user computers comprising one or more hardware processors and comprising memory, wherein the memory stores executable instructions, the executable instructions comprising:
  an administrative module;
  wherein said administrative module includes configuration settings for inbound or outbound communications;
  wherein said administrative module is located in one of the one or more user computers,
  wherein said administrative module configures one or more different access levels, and
  wherein said administrative module is configured to create one or more different types of user accounts, wherein each of the said multiple types of user accounts requires one or more unique authentication credentials;
  a first proxy server in at least one of the said one or more user computers;
  wherein the first proxy server has access to the world wide web;
  wherein said first proxy server is configured by the administrative module;
  wherein said first proxy server further comprises at least one of a friendly inbound list and an unfriendly inbound list per user account;
  wherein when said first proxy server comprises both a friendly inbound list and an unfriendly inbound list of a particular user account, only one of said friendly inbound list and said unfriendly inbound list of the particular user account is active in said first proxy server at any given time;
  wherein said first proxy server further comprises at least one of a friendly outbound list and an unfriendly outbound list per user account;
  wherein when said first proxy server comprises both a friendly outbound list and an unfriendly outbound list of the particular user account, only one of said friendly outbound list and said unfriendly outbound list of the particular user account is active in said first proxy server at any given time;
  wherein either (i) said one of the said friendly inbound list and said unfriendly inbound list in said first proxy server is uniquely configurable for each user account or (ii) said one of the said friendly outbound list and said unfriendly outbound list in said first proxy server is uniquely configurable for each user account;
  wherein said first proxy server is programmed to:
    receive a request from said requesting client,
    check one or more identity attributes of said requesting client against one or more of the friendly inbound list of a particular user account and the unfriendly inbound list of the particular user account;
    check said text of said requesting URL against one or more of the friendly outbound list of the particular user account and the unfriendly outbound list of the particular user account;

either approve said request from said requesting client, terminate said request from said requesting client, or re-route said request from said requesting client;

wherein said requesting client is either an HTTP (Hypertext Transfer Protocol) application or a web browser.

96. A versatile customizable combination system for providing filtering of outbound requests for access to web sites on the Internet or for controlling inbound requests for access to web resources protected by said system, or for filtering both outbound requests for access to web sites on the Internet and controlling inbound requests from the Internet for access to web resources protected by said system, said system having at least one user account, said system comprising:

one or more user computers, wherein each of the said one or more user computers comprises either a dynamically allocated Internet protocol address or a static Internet protocol address;

the one or more user computers comprising one or more hardware processors and comprising memory, wherein the memory stores executable instructions, the executable instructions comprising:

an administrative module;

wherein said administrative module includes configuration settings for inbound or outbound communications;

wherein said administrative module is located in one of the one or more user computers, wherein said administrative module configures one or more different access levels, and wherein said administrative module is configured to create one or more different types of user accounts, wherein each of the said one or more different types of user accounts requires one or more unique authentication credentials;

a first proxy server in at least one of the said one or more user computers;

wherein the first proxy server is part of a local area network with access to the world wide web;

wherein said first proxy server is configured by the administrative module;

wherein said first proxy server further comprises at least one of a friendly inbound list and an unfriendly inbound list per user account;

wherein when said first proxy server comprises both a friendly inbound list and an unfriendly inbound list of a particular user account, only one of said friendly inbound list and said unfriendly inbound list of the particular user account is active in said first proxy server at any given time;

wherein said one of said friendly inbound list and said unfriendly inbound list in said first proxy server is uniquely configurable for each user account;

wherein said first proxy server is programmed to:
 receive a request from said requesting client,
 check one or more identity attributes of said requesting client against one or more of the friendly inbound list of the particular user account and the unfriendly inbound list of the particular user account;
 either approve said request from said requesting client, terminate said request from said requesting client, or re-route said request from said requesting client;

wherein said requesting client is either an HTTP (Hypertext Transfer Protocol) application or a web browser.

97. A versatile customizable combination system for providing filtering of outbound requests for access to web sites on the Internet or for controlling inbound requests from the Internet for access to web resources protected by the system, or for filtering both outbound requests for access to web sites on the Internet and controlling inbound requests from the Internet for access to web resources protected by said system, the system having at least one user account, said system comprising:

one or more user computers, wherein each of the said one or more user computers comprises either a dynamically allocated Internet protocol address or a static Internet protocol address;

the one or more user computers comprising one or more hardware processors and comprising memory, wherein the memory stores executable instructions, the executable instructions comprising:

an administrative module, wherein said administrative module includes configuration settings for inbound or outbound communications, wherein said administrative module is located in one of the one or more user computers, wherein said administrative module configures one or more different access levels, and wherein said administrative module is configured to create one or more different types of user accounts, wherein each of the said multiple types of user accounts requires one or more unique authentication credentials;

a first proxy server in at least one of the said one or more user computers;

wherein the first proxy server has access to the world wide web, wherein said first proxy server is configured by the administrative module, wherein said first proxy server further comprises at least one of a friendly inbound list and an unfriendly inbound list per user account, wherein said first proxy server is programmed to:
 receive a request from said requesting client,
 check one or more identity attributes of said requesting client against one or more of the friendly inbound list of a particular user account and the unfriendly inbound list of the particular user account; and
 either approve said request from said requesting client, terminate said request from said requesting client, or re-route said request from said requesting client;

wherein said requesting client is either an HHTP application or a web browser;

a second proxy server in at least one of the one or more computers;

wherein said second proxy server is placed between said first proxy server and either a resource or the Internet;

wherein said second proxy server does not comprise said administrative module, said friendly inbound list of the particular user account, or (ii) said unfriendly inbound list of the particular user account;

wherein said second proxy server communicates either with a proxy of a destination or directly to said destination;

wherein said second proxy server further comprises an Internet Protocol address used for proxy forwarding, wherein said Internet Protocol address used for proxy forwarding is set during configuration of said first proxy server, wherein said Internet Protocol address used for proxy forwarding is configurable by either an administrative account or a type of user account with administrative privileges;

wherein said first proxy server forwards said request to said second proxy server if said first proxy server approves said request;

wherein said first proxy server and said second proxy server are in communication with one another through a network communication link.

98. A versatile customizable combination system for providing filtering of outbound requests for access to web sites on the Internet or for controlling inbound requests from the Internet for access to web resources protected by the system, or for filtering both outbound requests for access to web sites on the Internet and controlling inbound requests from the Internet for access to web resources protected by said system, the system having at least one user account, said system comprising:
- one or more user computers, wherein each of the said one or more user computers comprises either a dynamically allocated Internet protocol address or a static Internet protocol address;
- the one or more user computers comprising one or more hardware processors and comprising memory, wherein the memory stores executable instructions, the executable instructions comprising:
- an administrative module,
- wherein said administrative module is located in one of the one or more user computers,
- wherein said administrative module configures one or more different access levels, and
- wherein said administrative module is configured to create one or more different types of user accounts, wherein each of the said one or more different types of user accounts requires one or more unique authentication credentials;
- a first proxy server in at least one of the said one or more user computers;
- wherein the first proxy server has access to the world wide web,
- wherein said first proxy server is configured by the administrative module,
- wherein said first proxy server is programmed to:
  - receive a request from said requesting client, and
  - either approve said request from said requesting client, terminate said request from said requesting client, or re-route said request from said requesting client;
- wherein said requesting client is either an HTTP application or a web browser;
- second proxy server in at least one of the one or more computers;
- wherein said second proxy server is placed between said first proxy server and either a resource or the Internet;
- wherein said second proxy server does not comprise said administrative module,
- wherein said second proxy server communicates either with a proxy of a destination or directly to said destination;
- wherein said second proxy server further comprises an Internet Protocol address used for proxy forwarding, wherein said Internet Protocol address used for proxy forwarding is set during configuration of said first proxy server, wherein said Internet Protocol address used for proxy forwarding is configurable by either an administrative account or a type of user account with administrative privileges;
- wherein said first proxy server forwards said request to said second proxy server if said first proxy server approves said request;
- wherein said first proxy server and said second proxy server are in communication with one another through a network communication link.

99. A versatile customizable combination system for providing filtering of outbound requests for access to web sites on the Internet or for controlling inbound requests from the Internet for access to web resources protected by the system, or for filtering both outbound requests for access to web sites on the Internet and controlling inbound requests from the Internet for access to web resources protected by said system, the system having at least one user account, said system comprising:
- one or more user computers, wherein each of the said one or more user computers comprises either a dynamically allocated Internet protocol address or a static Internet protocol address;
- the one or more user computers comprising one or more hardware processors and comprising memory, wherein the memory stores executable instructions, the executable instructions comprising:
- an administrative module,
- wherein said administrative module includes configuration settings for inbound or outbound communications,
- wherein said administrative module is located in one of the one or more user computers,
- wherein said administrative module configures a range of access levels, and
- wherein said administrative module is configured to create multiple types of user accounts, wherein each of the said multiple types of user accounts requires one or more unique authentication credentials;
- a first proxy server in at least one of the said one or more user computers;
- wherein the first proxy server has access to the world wide web,
- wherein said first proxy server is configured by the administrative module,
- wherein said first proxy server further comprises at least one of a friendly outbound list and an unfriendly outbound list per user account,
- wherein said first proxy server is programmed to:
  - receive a request from said requesting client,
  - check the text of a requested URL (uniform resource locator) against one or more of the friendly outbound list of a particular user account and the unfriendly outbound list of the particular user account; and
  - either approve said request from said requesting client, terminate said request from said requesting client, or re-route said request from said requesting client;
- wherein said requesting client is either an HTTP (Hypertext Transfer Protocol) application or a web browser;
- a second proxy server in at least one of the one or more computers;
- wherein said second proxy server is placed between said first proxy server and either a resource or the Internet;
- wherein said second proxy server does not comprise said administrative module, said friendly outbound list of the particular user account, or said unfriendly outbound list of the particular user account;
- wherein said second proxy server communicates either with a proxy of a destination or directly to said destination;
- wherein said second proxy server further comprises an Internet Protocol address used for proxy forwarding, wherein said Internet Protocol address used for proxy forwarding is set during configuration of said first proxy server, wherein said Internet Protocol address used for proxy forwarding is configurable by either an administrative account or a type of user account with administrative privileges;

wherein said first proxy server forwards said request to said second proxy server if said first proxy server approves said request;

wherein said first proxy server and said second proxy server are in communication with one another through a network communication link.

\* \* \* \* \*